US011249308B2

(12) United States Patent
Yamashita et al.

(10) Patent No.: US 11,249,308 B2
(45) Date of Patent: Feb. 15, 2022

(54) DISPLAY DEVICE IN MOVING BODY FOR DISPLAYING SUPERIMPOSED VIRTUAL IMAGE AND DISPLAY CONTROL METHOD

(71) Applicant: Panasonic Intellectual Property Management Co., Ltd., Osaka (JP)

(72) Inventors: Chisato Yamashita, Osaka (JP); Keiichiro Obayashi, Osaka (JP); Makoto Funabiki, Osaka (JP); Jun Imamura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/667,770

(22) Filed: Oct. 29, 2019

(65) Prior Publication Data

US 2020/0064629 A1 Feb. 27, 2020

Related U.S. Application Data

(63) Continuation of application No. PCT/JP2018/015933, filed on Apr. 18, 2018.

(30) Foreign Application Priority Data

May 10, 2017 (JP) .............................. JP2017-094277

(51) Int. Cl.
*G02B 27/01* (2006.01)
*G06F 3/14* (2006.01)
*G02B 27/48* (2006.01)

(52) U.S. Cl.
CPC ..... *G02B 27/0101* (2013.01); *G02B 27/0179* (2013.01); *G06F 3/1446* (2013.01);
(Continued)

(58) Field of Classification Search
None
See application file for complete search history.

(56) References Cited

U.S. PATENT DOCUMENTS 10,466,062 B2 * 11/2019 Maruyama ............. G01C 21/36
10,852,818 B2 * 12/2020 Saisho ................... B60K 35/00
(Continued)

FOREIGN PATENT DOCUMENTS

JP 2009-020089 1/2009
JP 4476719 B 6/2010
(Continued)

OTHER PUBLICATIONS

International Search Report of PCT application No. PCT/JP2018/015933 dated Jul. 17, 2018.

*Primary Examiner* — James A Thompson
(74) *Attorney, Agent, or Firm* — Greenblum & Bernstein, P.L.C.

(57) ABSTRACT

Display device included in a moving body includes road information acquisition unit that acquires road information about a road in a traveling direction of the moving body and display controller that displays a virtual image illustrating at least one graphic as seen from the moving body on a display medium while superimposing the virtual image on a real space in the traveling direction when the at least one graphic is assumed to be disposed at a predetermined position in the traveling direction. Display controller updates a mode of the at least one graphic using the road information acquired by the road information acquisition unit, and displays the virtual image illustrating the updated at least one graphic on the display medium.

3 Claims, 12 Drawing Sheets

(52) U.S. Cl.
CPC ........ *G02B 27/48* (2013.01); *G02B 2027/014* (2013.01); *G02B 2027/0154* (2013.01)

(56) References Cited

U.S. PATENT DOCUMENTS

| | | | |
|---|---|---|---|
| 2005/0154505 A1* | 7/2005 | Nakamura | G01C 21/365 |
| | | | 701/1 |
| 2008/0091338 A1 | 4/2008 | Uehira | |
| 2009/0240426 A1* | 9/2009 | Akita | G01C 21/3647 |
| | | | 701/533 |
| 2010/0164702 A1* | 7/2010 | Sasaki | G01B 21/22 |
| | | | 340/438 |
| 2010/0292886 A1* | 11/2010 | Szczerba | G01S 13/723 |
| | | | 701/31.4 |
| 2011/0001639 A1 | 1/2011 | Sasaki et al. | |
| 2017/0038595 A1* | 2/2017 | Kutomi | G09G 5/38 |
| 2017/0336222 A1* | 11/2017 | Yamaguchi | G02B 27/0101 |
| 2017/0336627 A1* | 11/2017 | Ieda | G02B 27/0101 |
| 2018/0143431 A1* | 5/2018 | Matsuura | G02B 27/0093 |
| 2018/0157036 A1* | 6/2018 | Choi | G02B 27/0179 |
| 2019/0025580 A1* | 1/2019 | Nagano | G02B 27/01 |

FOREIGN PATENT DOCUMENTS

| | | |
|---|---|---|
| JP | 2010-156608 | 7/2010 |
| JP | 4852062 B | 1/2012 |
| JP | 5161760 B | 3/2013 |
| JP | 2016-090344 | 5/2016 |

\* cited by examiner

DISPLAY DEVICE IN MOVING BODY FOR DISPLAYING SUPERIMPOSED VIRTUAL IMAGE AND DISPLAY CONTROL METHOD

CROSS-REFERENCE TO RELATED APPLICATIONS

This application is a continuation of the PCT International Application No. PCT/JP2018/015933 filed on Apr. 18, 2018, which claims the benefit of foreign priority of Japanese patent application No. 2017-094277 filed on May 10, 2017, the contents all of which are incorporated herein by reference.

TECHNICAL FIELD

The present invention relates to a display device and a display control method for providing information to an occupant and the like of a moving body.

BACKGROUND ART

Conventionally, an in-vehicle bead-up-display (HUD) exists as the display device included in the moving body such as a vehicle. For example, PTL 1 discloses a technique of changing a size of at least one icon in an image with movement of the moving body in a navigation system that displays the image such that the image overlaps a scene seen in front of a windshield.

CITATION LIST

Patent Literature

PTL 1: Japanese Patent No. 4476719

SUMMARY OF THE INVENTION

The present invention provides a display device and a display control method for being able to adequately display a virtual image.

According to one aspect of the present invention, a display device included in a moving body, the display device includes: road information acquisition unit that acquires road information about a road in a traveling direction of the moving body; and a display controller that causes a head-up-display to display a virtual image illustrating at least one graphic as seen from the moving body on a display medium while superimposing the virtual image on a real space in the traveling direction when the at least one graphic is assumed to be disposed at a predetermined position in the traveling direction. The display controller updates a mode of the at least one graphic using the road information acquired by the road information acquisition unit, and causes a head-up-display to display the virtual image illustrating the updated at least one graphic on the display medium.

According to another aspect of the present invention, a display control method for controlling a display device included in a moving body, the display control method includes: a road information acquiring step of acquiring road information about a road in a traveling direction of the moving body; and a display control step of displaying a virtual image illustrating at least one graphic as seen from the moving body to a display medium while superimposing the virtual image on a real space in the traveling direction when the at least one graphic is assumed to be disposed at a predetermined position in the traveling direction in the real space. In the display control step, a mode of the at least one graphic is updated using the road information acquired by the road information acquisition unit, and the virtual image illustrating the updated at least one graphic is displayed to the display medium.

The present invention can provide the display device and the display control method for being able to adequately display the virtual image for an occupant of the moving body.

DESCRIPTION OF EMBODIMENT

Figure 1:
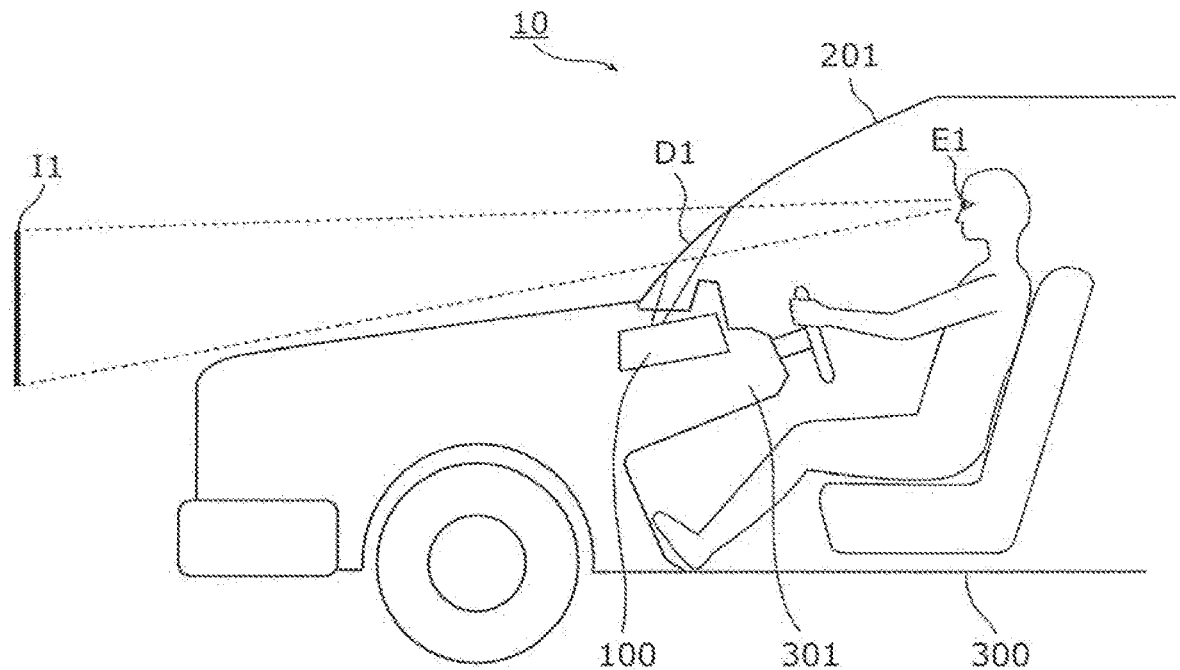
FIG. 1 is a view illustrating a use example of a display system including a display device according to an exemplary embodiment.

In the conventional display device, for example, when the graphic (virtual image) such as an arrow is displayed while superimposed on a predetermined position of the forward road surface (real space), a situation in which the size or a display mode of the virtual image is not adequate is generated depending on a distance to the predetermined position or a gradient of the road surface of the predetermined position.

The inventors of the present application have found the following problems in the display device incorporated in the moving body. For example, when an in-vehicle display device (such as a head-up-display) displays driver support information (such as a route guidance arrow and characters of "stop", hereinafter simply referred to as a "graphic") while superimposing the driver support information on road surface, the virtual image is generated based on the graphic enlarged in a longitudinal direction similarly to the graphic actually drawn on the road surface. That is, when the graphic enlarged in the longitudinal direction is assumed to be disposed on the road surface, the virtual image indicating the graphic as seen from the vehicle is displayed. Consequently, because the graphic is seen from the driver who sees the graphic from obliquely above while compressed in the longitudinal direction, the visual recognition of the driver is improved.

However, the virtual image illustrating the graphic is enlarged when the vehicle comes close to the graphic, which results in a problem in that the visual recognition of the object in front of the vehicle is disturbed as seen from the driver. That is, although the object does not exist between the graphic and the road surface because the actual graphic is drawn on the road surface, the object such as a person, an animal, and an obstacle exists behind the vas seen from the driver when the virtual image is displayed while superimposed on the real space. For this reason, the visual recognition of the forward object is disturbed by the virtual image.

For example, when the graphic such as the arrow is disposed on the slope, a problem in that the virtual image illustrating the graphic becomes too large or too small depending on the gradient of the slope. As a result, the excessive enlargement of the virtual image generates the degradation of the forward visual recognition. When the virtual image is too small, the driver hardly recognizes the graphic illustrated in the virtual image.

In order to solve the problems, a display device according to one aspect of the present invention is included in a moving body the display device includes: road information acquisition unit that acquires road information about a road in a traveling direction of the moving body; and a display controller that causes a head-up-display to display a virtual image illustrating at least one graphic as seen from the moving body on a display medium while superimposing the virtual image on a real space in the traveling direction when the at least one graphic is assumed to be disposed at a predetermined position in the traveling direction. The display controller updates a mode of the at least one graphic using the road information acquired by the road information acquisition unit, and causes a head-up-display to display the virtual image illustrating the updated at least one graphic on the display medium.

With this configuration, the mode (such as a size, a shape, a spacing between graphics, and a moving speed) of at least one graphic that becomes a base of the virtual image and is virtually disposed at a predetermined position are not constant, but is updated according to the road information. Consequently, for example, the size of at least one graphic virtually disposed can be adjusted according to a positional relationship between the moving body and the predetermined position, and resultantly the size of at least one graphic on the display can be set to the adequate size. Thus, the display device according to present aspect can adequately display the virtual image.

The road information acquisition unit may acquire the road information indicating a distance between the moving body and a disposition position that is a virtual position where the at least one graphic is to be disposed in the real space.

With this configuration, the display device can adequately display the virtual image according to the distance between the disposition position of the at least one graphic and the moving body.

The display controller may decrease a length in the traveling direction of the at least one graphic with decreasing distance between the moving body and the disposition position, the distance being indicated by the road information.

With this configuration, for example, excessive enlargement of at least one graphic illustrated by the virtual image is prevented when the moving body comes close to the disposition position of at least one graphic, and resultantly the degradation of the forward visual recognition due to the at least one graphic is prevented.

The display controller may increase a length in the traveling direction of the at least one graphic with increasing distance between the moving body and the disposition position, the distance being indicated by the road information.

With this configuration, for example, when the disposition position of at least one graphic is located relatively far from the moving body, the at least one graphic is easily visually recognized.

The road information acquisition unit may acquire the road information indicating a relative gradient angle that is an angle formed between the traveling direction and a road surface at the disposition position that is the virtual position where the at least one graphic is to be disposed.

With this configuration, for example, when the disposition position of at least one graphic is a slope, display device can adequately display the virtual image according to a gradient of the slope.

The display controller may decreases a length in an extending direction of a road at the disposition position of the at least one graphic or a spacing in an extending direction of two graphics in the at least one graphic with increasing relative gradient angle indicated by the road information when upward of the moving body is set to positive.

With this configuration, for example, when the disposition position of at least one graphic is an upslope, the excessive enlargement of at least one graphic illustrated in the virtual image is prevented. As a result, the degradation of the forward visual recognition due to the at least one graphic is prevented. The spacing between two graphics continuously disposed is prevented from extending excessively. As a result, for example, continuity of the two graphics is maintained.

The display controller may increases a length in an extending direction of a road at the disposition position of the at least one graphic or a spacing in an extending direction of two graphics in the at least one graphic with decreasing relative gradient angle indicated by the road information when upward of the moving body is set to positive.

With this configuration, for example, when the disposition position of at least one graphic is a downslope, excessive reduction of at least one graphic illustrated in the virtual image is prevented. As a result, for example, the at least one graphic is easily visually recognized. The spacing between two graphics continuously disposed is prevented from being excessively narrowed. As a result, for example, the degradation of the forward visual recognition due to the two graphics is prevented.

The display controller may superimpose the virtual image on the real space to cause a head-up-display to display the virtual image on the display medium while moving the at least one graphic in the extending direction of the road at the disposition position, and decrease a moving speed of at least one graphic with increasing relative gradient angle indicated by the road information when upward of the moving body is set to positive.

With this configuration, for example, when the disposition position of at least one graphic moving along a movement route is the upslope, generation of a state in which the moving speed of the at least one graphic on the visual recognition of the driver is too fast is prevented.

The display controller may superimpose the virtual image on the real space to cause a head-up-display to display the virtual image on the display medium while moving the at least one graphic in the extending direction of the road at the disposition position, and increase a moving speed of at least one graphic with decreasing relative gradient angle indicated by the road information when upward of the moving body is set to positive.

With this configuration, for example, when the disposition position of at least one graphic moving along the movement route is the downslope, the generation of a state in which the moving speed of the at least one graphic on the visual recognition of the driver is too slow is prevented.

The road information acquisition unit may acquire the road information indicating a turning angle that is an angle formed between the traveling direction and an extending direction of a road at a disposition position that is a virtual position where the at least one graphic is to be disposed.

With this configuration, for example, the display device can adequately display the virtual image according to the turning angle when the disposition position of at least one graphic is located ahead of a position (direction change position) where the route turns laterally as seen from the traveling direction.

The display controller may decrease a length in the extending direction of the at least one graphic or a spacing in the extending direction of two graphics in the at least one graphic with increasing turning angle indicated by the road information.

With this configuration, for example, when the turning angle is large, the excessive enlargement of at least one graphic located ahead of the direction change position is prevented. As a result, for example, the driver can recognizes that the graphic seen frontally from the driver and the graphic located ahead of the direction change position are to be the same type graphic. The spacing between two graphics that are continuously disposed and located ahead of the direction change position is prevented from extending excessively. As a result, for example, the two graphics are easily visually recognized.

The display controller may increase a length in the extending direction of the at least one graphic or a spacing in the extending direction of two graphics in the at least one graphic with decreasing turning angle indicated by the road information.

With this configuration, for example, when the turning angle is small, the excessive reduction of at least one graphic located ahead of the direction change position is prevented. As a result, for example, the driver can recognizes that the graphic seen frontally from the driver and the graphic located ahead of the direction change position are to be the same type graphic. The spacing between two graphics that are continuously disposed and located ahead of the direction change position is prevented from being excessively narrowed. As a result, for example, the degradation of the forward visual recognition due to the two graphics is prevented.

A display control method according to another aspect of the present invention for controlling a display device included in a moving body, the display control method includes: a road information acquiring step of acquiring road information about a road in a traveling direction of the moving body; and a display control step of displaying a virtual image illustrating at least one graphic as seen from the moving body to a display medium while superimposing the virtual image on a real space in the traveling direction when the at least one graphic is assumed to be disposed at a predetermined position in the traveling direction in the real space. In the display control step, a mode of the at least one graphic is updated using the road information acquired by the road information acquisition unit, and the virtual image illustrating the updated at least one graphic is displayed to the display medium.

In the display control method, the size of at least one graphic that becomes a base of the virtual image and is virtually disposed at the predetermined position is not constant, but are updated according to the road information. Consequently, for example, the size of at least one graphic virtually disposed can be adjusted according to a positional relationship between the moving body and the predetermined position, and resultantly the size of at least one graphic on the display can be set to the adequate size. Thus, in the display control method according to present aspect, the virtual image can adequately be displayed.

These comprehensive or specific aspects may be implemented by a system, a method, an integrated circuit, a computer program, or a (non-transitory) recording medium such as a computer readable CD-ROM, or may be implemented by any combination of the system, the method, the integrated circuit, the computer program, or the recording medium.

Hereinafter, an exemplary embodiment of the present invention will be described in detail with reference to the drawings. The following exemplary embodiment illustrates a comprehensive or specific example of the present invention. Numerical values, shapes, constituent elements, arrangement positions of the constituent elements, steps, and order of the steps illustrated in the following exemplary embodiment are merely examples, and therefore do not limit the present invention. Among the constituent elements in the following exemplary embodiment, constituent elements not recited in the independent claims can be added as appropriate. Each drawing is schematic, and is not necessarily precisely drawn.

In the following exemplary embodiment, expressions such as, parallel and orthogonal, which indicate a relative direction or posture, are occasionally used, and the expressions include the case where the relative direction or posture are not strictly the direction or the posture The term "two directions are parallel to each other" means not only that the two directions are perfectly parallel to each other, but also that the two directions are substantially parallel to each other, namely, including a difference of, for example, about several percent.

Exemplary Embodiment

Display system 10 constructed with a group of vehicle devices including display device 100 will be described below with reference to the drawings as an exemplary embodiment of the present invention.

FIG. 1 is a view illustrating a use example of display system 10 including display device 100 of the exemplary embodiment.

Display system 10 including display device 100 includes a HUD, which is mounted on the moving body such as vehicle 300 and projects the image illustrating information onto predetermined region D1 of the display medium such as windshield 201 to allow an occupant (in the exemplary embodiment, a driver) of the moving body having point of view E1 to visually recognize a virtual image reflecting the information.

In the example of FIG. 1, display device 100 is installed on dashboard 301 of vehicle 300. In a field of view of the driver having point of view E1, a virtual image is visually recognized so as to be reflected on virtual HUD display plane I1 located in front of vehicle 300. Display system 10 displays the virtual image in the field of view of the driver while the virtual image overlaps a real space spreading in front of vehicle 300.

In the exemplary embodiment, although display system 10 is applied to a vehicle that is a moving body by way of example, the moving body is not limited to the vehicle, and may be a ship, an aircraft, or the like. In the exemplary embodiment, although the occupant of the moving body is the driver of the vehicle, the occupant is not limited to the driver. A display range (that is, a maximum range where the virtual image can be displayed) of the virtual image displayed within the field of view of the occupant by projection of the image using the HUD is restricted to a certain region due to arrangement, structure, and the like of the HUD.

Figure 2:
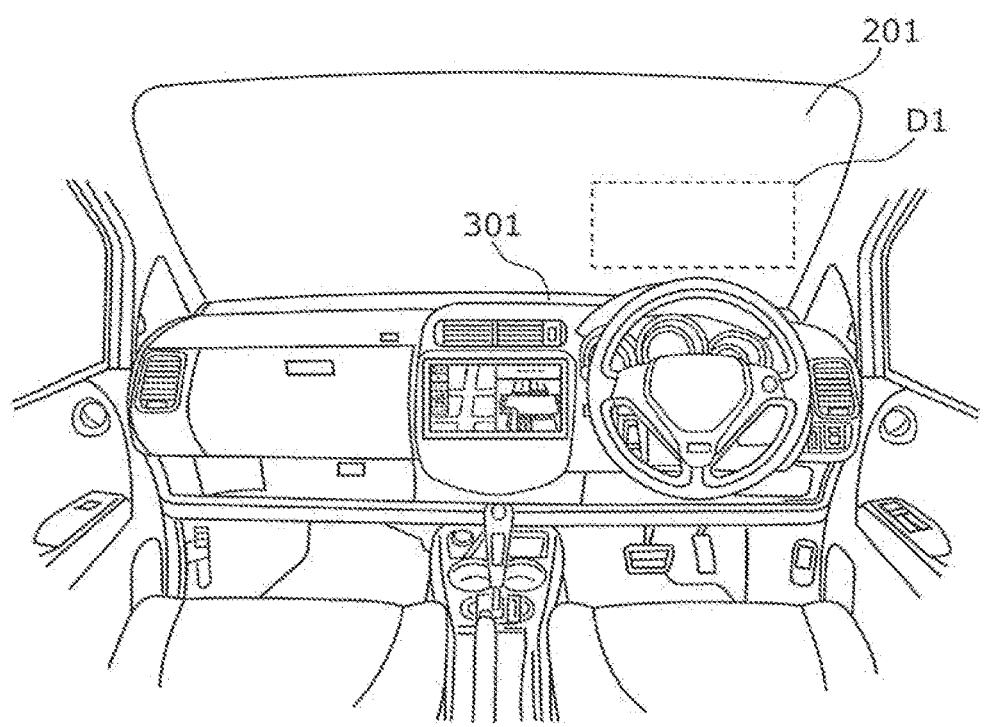
FIG. 2 is a view illustrating an example of a predetermined region to which an image displayed by the display device of the exemplary embodiment is projected.

FIG. 2 is a view illustrating an example of a range of predetermined region D1 of windshield 201 (display medium) onto which the image displayed by display device 100 is projected as seen from inside vehicle 300. Predetermined region D1 is a region corresponding to a certain angle of field (certain viewing angle) in the field of view of the occupant (driver) looking at a front side of vehicle 300.

Figure 3A:
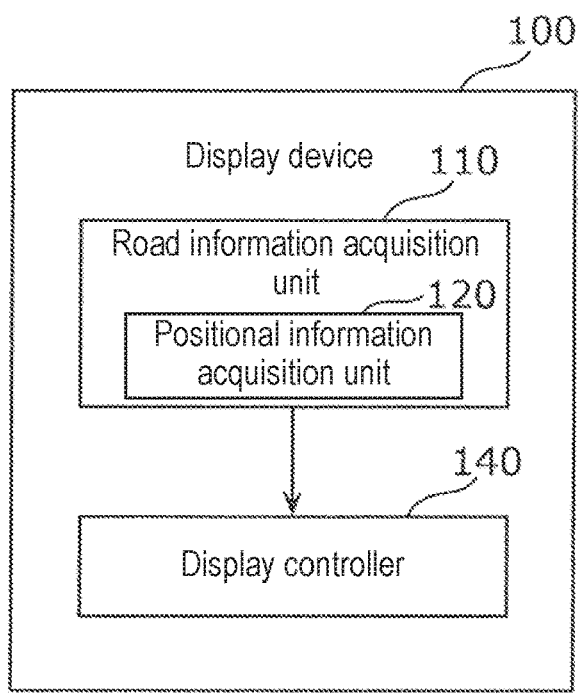
FIG. 3A is a block diagram illustrating a basic functional configuration of the display device of the exemplary embodiment.
Figure 3B:
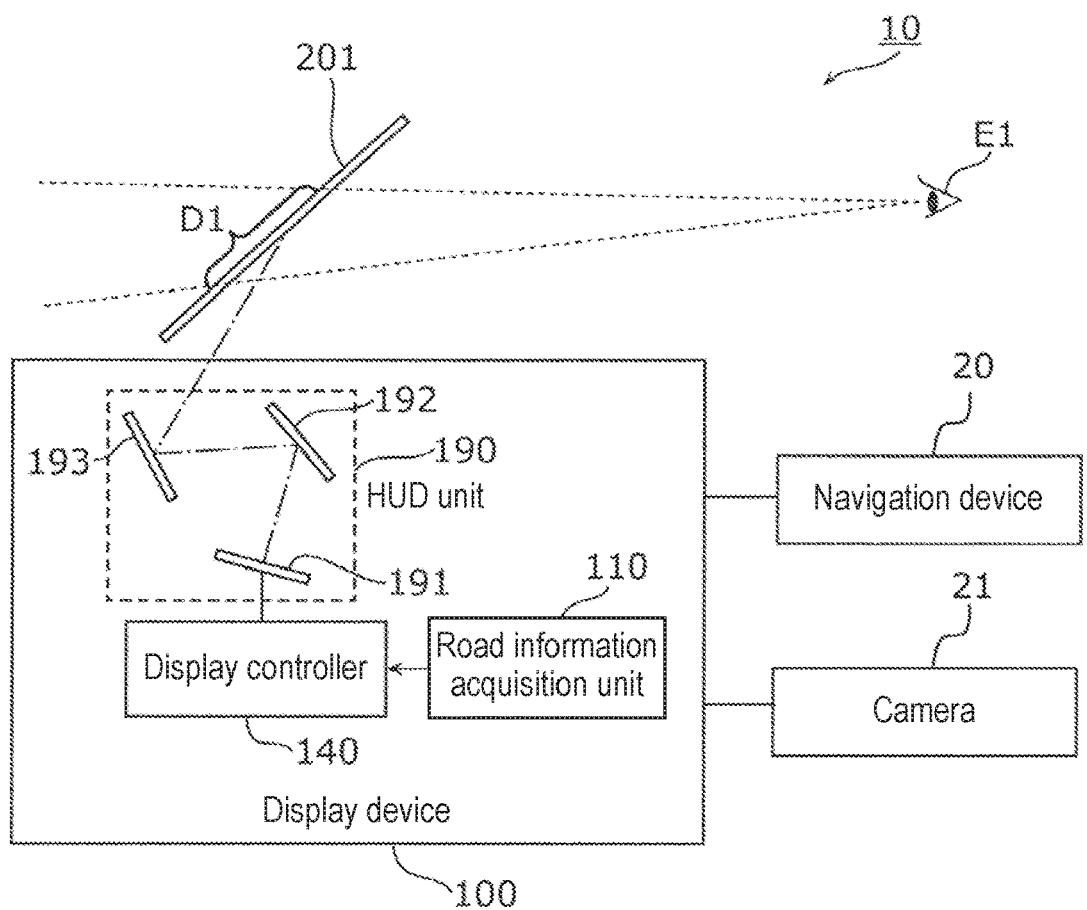
FIG. 3B is a view illustrating an example of a system configuration of the display system of the display device of the exemplary embodiment.

FIG. 3A is a block diagram illustrating a basic functional configuration of display device 100 of the exemplary embodiment, and FIG. 3B is a view illustrating an example of a system configuration of display system 10 including display device 100.

Display device 100 is an example of the display device included in the moving body, and includes road information acquisition unit 110 and display controller 140. Road information acquisition unit 110 acquires road information about a road in a traveling direction of vehicle 300. when at least one graphic is disposed at a predetermined position in the traveling direction of vehicle 300, display controller 140 displays the virtual image illustrating the at least one graphic viewed from vehicle 300 to the display medium while superimposing the virtual image on the real space in the traveling direction. In the exemplary embodiment, the virtual image illustrating the graphic such as an arrow indicating the traveling direction is displayed to windshield 201 that is an example of the display medium. Specifically, display device 100 of the exemplary embodiment projects the virtual image onto windshield 201 using HUD unit 190 as illustrated in FIG. 3B, thereby presenting the virtual image superimposed on the real space to the driver.

As illustrated in FIG. 3B, display system 10 of the exemplary embodiment includes display device 100, navigation device 20, camera 21, and windshield 201. Road information acquisition unit 110 of display device 100 acquires the road information based on various pieces of information received from camera 21 and navigation device 20.

Camera 21 is mounted inside or outside the vehicle, and is an image sensor that successively (for example, at predetermined time intervals such as 1/60 second) images a foreground of the driver of the vehicle.

Camera 21 transfer captured image data to display device 100. For example, road information acquisition unit 110 of display device 100 acquires a slope shape, a curve shape, and the like of the road in the foreground (that is, the traveling direction at that time) of vehicle 300 as the road information from the captured image data.

Navigation device 20 includes a global positioning system (GPS) receiver, and has a vehicle navigation function based on positioning information obtained by GPS and map data. For example, navigation device 20 may include a memory, a storage device such as a hard disc device, and a transmitting and receiving device, and the like in order to acquire and store the map data from outside by communication. Navigation device 20 can measure a current position of vehicle 300 using a GPS, and calculate the traveling direction of the vehicle using the current position and the position of vehicle 300 measured in the past. Navigation device 20 recognizes a target object (display item) within a predetermined distance (for example, 100 m) in front of vehicle 300 in the traveling direction based on the map data, and outputs information such as a content and position of each display item as a recognition result. For example, the target object that should be recognized based on the map data is an intersection. For example, as to the recognized intersection, the graphic (for example, a right-turn mark) guiding a route to a destination previously input to navigation device 20 by the driver and the like of vehicle 300 can become the content of the display item.

Specifically, road information acquisition unit 110 of the exemplary embodiment includes positional information acquisition unit 120, and positional information acquisition unit 120 acquires the current position of vehicle 300 and a virtual position (hereinafter, also referred to as a "disposition position") where the route guiding graphic such as the right-turn mark from navigation device 20. That is, road information acquisition unit 110 acquires these pieces of positional information as the road information.

A device of an acquisition destination of the information necessary for road information acquisition unit 110 is not limited to camera 21 and navigation device 20. For example, road information acquisition unit 110 may acquire various pieces of information as the road information from light detection and ranging, laser Imaging detection and ranging (LIDAR), a gyroscope sensor, or an acceleration sensor.

HUD unit 190 projects the image onto windshield 201 under control of display controller 140. For example, HUD unit 190 includes liquid crystal display (LCD) 191, plane mirror 192, and concave mirror 193. The image including the graphic, such as the right-turn mark, which is generated by display controller 140, is displayed on LCD 191. The image displayed on LCD 191 is reflected by plane mirror 192, magnified by concave mirror 193, and projected (reflected) onto windshield 201.

For example, display device 100 includes a computer including a memory and a processor (microprocessor) as a hardware configuration. The processor executes a control program stored in the memory to control each unit of display device 100, thereby implementing various functions. The memory is a read only memory (ROM) that preliminarily keeps program and data, a random access memory (RAM) that is used to store data or the like in program execution, and the like, and may include, for example, a non-volatile memory. For example, the control program regulates display control processing of allowing the driver of vehicle 300 to visually recognize the virtual image by displaying the image to the display medium. By executing the control program for the display control processing using the processor, for example, display device 100 has a function of acquiring various pieces of information from camera 21, navigation device 20, and the like and controlling the display of HUD unit 190 based on the information.

The configuration of the functional block of display device 100 is not limited to the configuration of the functional block in FIG. 3A. For example, road information acquisition unit 110 may be divided into a functional block that acquires the information such as the road itself such as the slope shape and the curve shape of the road and a functional block that acquires the positional information such as the current position of vehicle 300 and the disposition position of the graphic such as the right-turn mark. In this case, a set of pieces of information acquired by the functional blocks can be dealt with as the road information.

Figure 4:
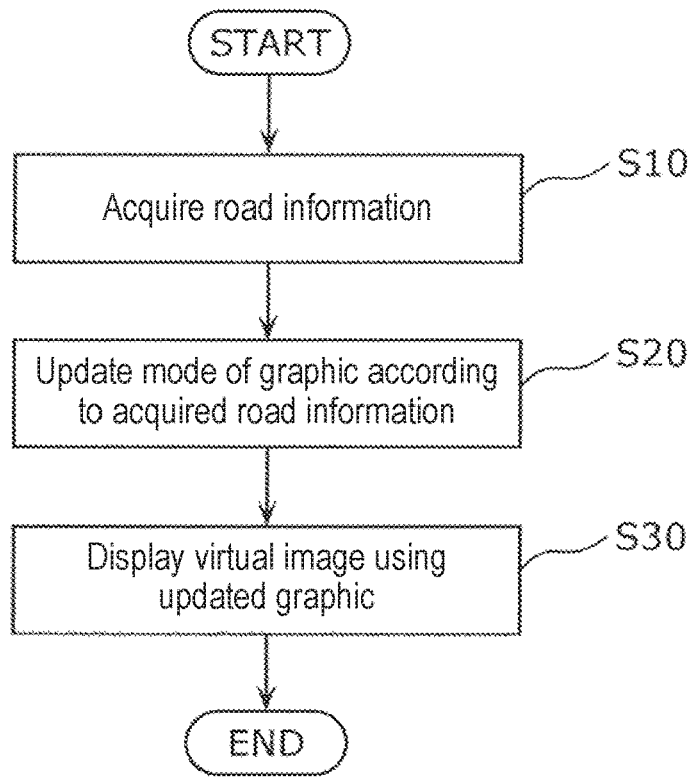
FIG. 4 is a flowchart illustrating display control processing of the display device of the exemplary embodiment.

An operation example of display system 10 of the exemplary embodiment will be described below with a focus on the display control processing in display device 100. A basic flow of the display control processing performed by display device 100 will be described with reference to FIG. 4. FIG. 4 is a flowchart illustrating the display control processing of display device 100 of the exemplary embodiment.

Road information acquisition unit 110 of display device 100 acquires the road information about the road in the traveling direction of vehicle 300 (S10). Using the road information, display controller 140 updates a mode (such as a size, a shape, a spacing between graphics, and a moving speed) of at least one graphic virtually disposed at a predetermined position in the traveling direction (S20). Display controller 140 displays the virtual image illustrating at least one updated graphic on windshield 201 (S30). In the exemplary embodiment, as described above, display controller 140 displays the virtual image on windshield 201 by projecting the image from HUD unit 190 onto windshield 201.

Thus, in display device 100 of the exemplary embodiment, the size and the like of at least one graphic that becomes a base of the virtual image and is virtually disposed at the predetermined position are not constant, but are updated according to the road information. Consequently, for example, the size and the like of the graphic of at least one graphic illustrated in the virtual image can be adjusted according to a positional relationship between vehicle 300 and the predetermined position.

Specific examples of a display content by display device 100 that operates as described above will be described below with reference to schematic diagrams.

Specific Example 1

Figure 5:
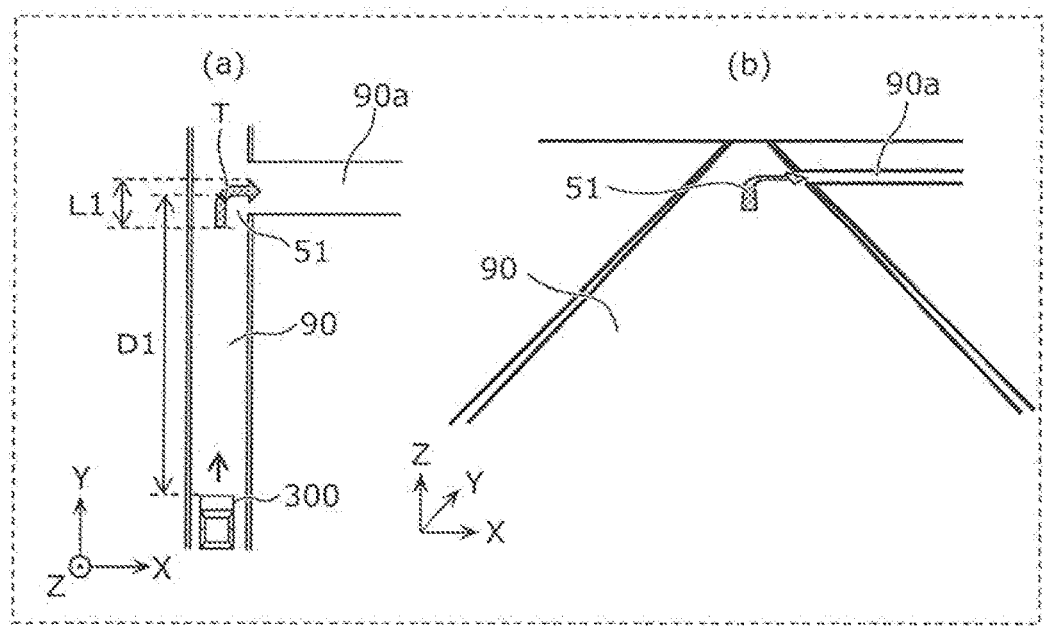
FIG. 5 is a first schematic diagram illustrating a specific example 1 of a display content by the display device.
Figure 6:
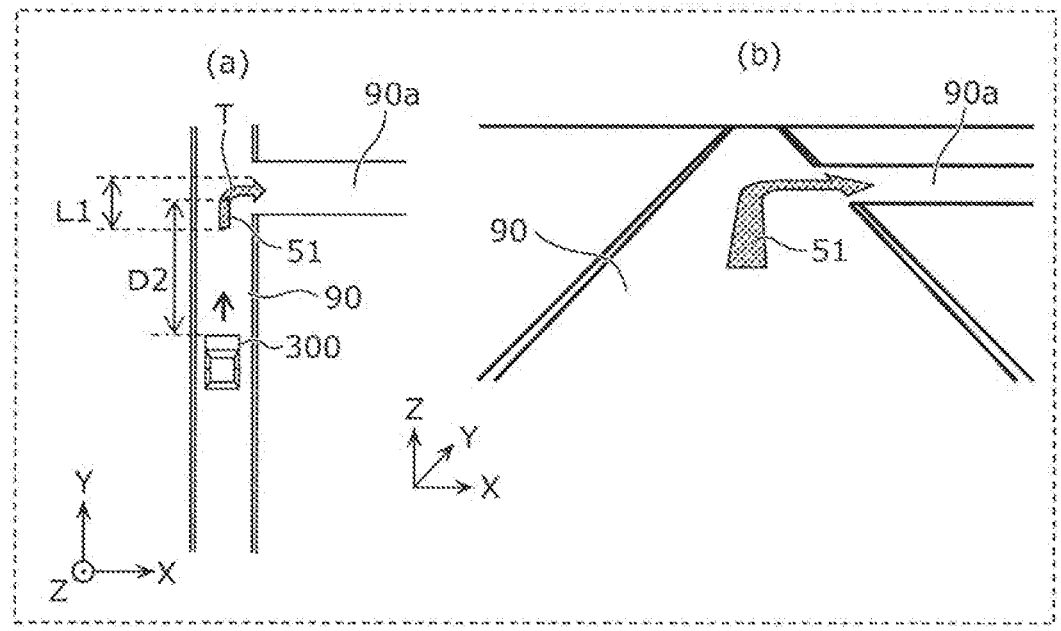
FIG. 6 is a schematic diagram illustrating a display content as a comparative example corresponding to the specific example 1.
Figure 7:
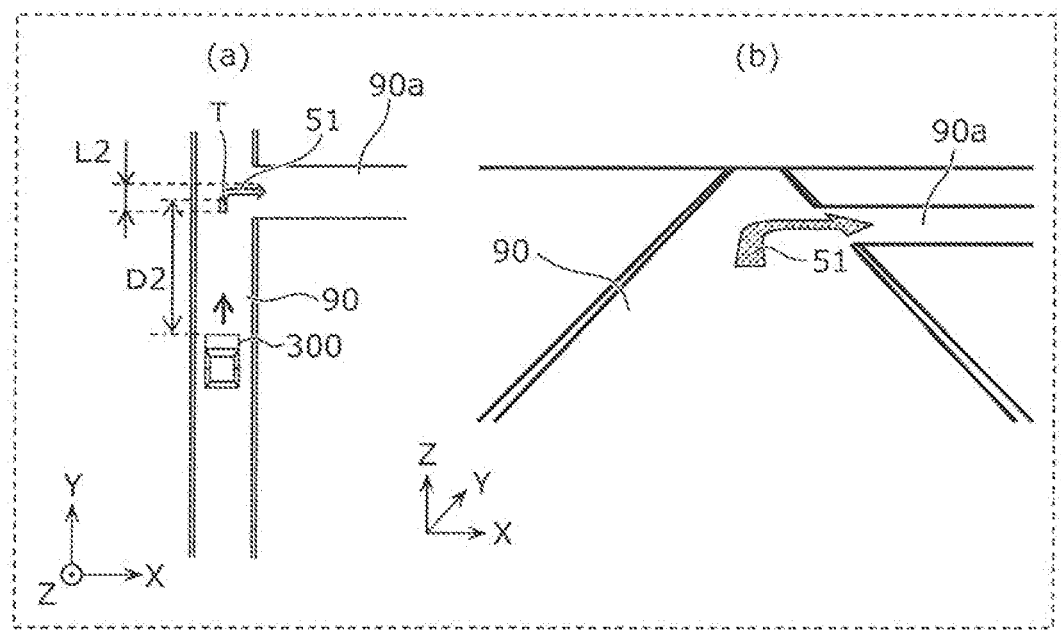
FIG. 7 is a second schematic diagram illustrating the specific example 1 of the display content by the display device.

FIG. 5 is a first schematic diagram illustrating a specific example 1 of the display content by display device 100. FIG. 6 is a schematic diagram illustrating a display content as a comparative example corresponding to the specific example 1. FIG. 7 is a second schematic diagram illustrating the specific example 1 of the display content by display device 100. In the description from FIG. 5, it is assumed that a Y-axis direction is the traveling direction of the vehicle, that an X-axis direction is a direction perpendicular to the Y-axis direction, and that a Z-axis direction is a direction perpendicular to the X-axis direction and the Y-axis direction. The Y-axis direction is a depth direction of the road on which the vehicle travels, the X-axis direction is a direction corresponding to the depth direction (horizontal direction) of the road crossing the road on which the vehicle travels at right angles vehicle. The Z-axis direction is a direction corresponding to a slope direction of the road.

The display content (the real space and the virtual image visually recognized through windshield 201 by the driver, the same shall apply hereinafter) in the case where vehicle 300 goes straight on road 90, turns right at spot T on road 90, and enters road 90a as illustrated in FIGS. 5 and 6 will be described in the specific example 1.

In the specific example 1, as illustrated in part (a) of FIG. 5, graphic 51 (length L1 in the traveling direction) indicating the right-turn mark is virtually disposed at predetermined position (spot T) in the traveling direction. That is, display controller 140 displays the virtual image illustrating graphic 51 having length L1 disposed at spot T on windshield 201 when the virtual image is viewed from vehicle 300 (more particularly, the driver of vehicle 300).

Display controller 140 calculates the shape and the size of graphic 51 at a point of time graphic 51 is projected from HUD unit 190 (see FIG. 3B) using the shape of the road acquired by road information acquisition unit 110, the position of spot T, the position of vehicle 300, and the like. Display controller 140 generates the projection image using a calculation result, and projects the generated image from HUD unit 190 toward windshield 201. Because basic processing contents of the generation and the display of the projection image are identical to those in other specific examples, the description in other specific examples will be omitted.

The virtual image causing the driver to visually recognize that graphic 51 indicating the right-turn mark is disposed at spot T that is the position where vehicle 300 should turn right as illustrated in, for example, part (b) of FIG. 5 is displayed on windshield 201 by performing the pieces of processing in display device 100.

At this point, when D1 is a distance between vehicle 300 and spot T, the driver easily visually recognizes graphic 51, and graphic 51 has the size to an extent to which the visual recognition of the forward real space is not disturbed. However, thereafter, it is assumed that vehicle 300 approaches spot T and the distance between vehicle 300 and spot T becomes D2 (D2<D1) as illustrated in part (a) of FIG. 6. At this point, the size on the display of graphic 51 is enlarged as illustrated in part (b) of FIG. 6 when length L1 in the Y-axis direction of graphic 51 is kept constant, and resultantly, for example, when a certain object (such as a person, an animal, and an obstacle on the road) exists in front of vehicle 300, the visual recognition of the object can be disturbed by graphic 51. That is, a problem of degradation of the forward visual recognition is generated.

For this reason, in display device 100 of the exemplary embodiment, the length in the Y-axis direction of graphic 51 is updated to L2 (L2<L1) when the distance between vehicle 300 and spot T is D2 (D2<D1) as illustrated in part (a) of FIG. 7. Specifically, road information acquisition unit 110 acquires the road information indicating the distance between vehicle 300 and spot T that is the virtual position where graphic 51 is to be disposed. With shortening distance between vehicle 300 and spot T indicated by the road information, display controller 140 decreases the length (the length in the Y-axis direction in the specific example 1) in the traveling direction of vehicle 300 in graphic 51.

Consequently, as illustrated in part (b) of FIG. 7, the size on the display of graphic 51 is relatively reduced, and resultantly the visual recognition of the object is secured when some sort of object exists in front of vehicle 300. That is, the problem of the degradation of the forward visual recognition is hardly generated.

When the length of graphic 51 is changed, display controller 140 changes the length such that the position indicated by graphic 51 is not changed. That is, display controller 140 fixes a leading-end position of the arrow of graphic 51 that is the right-turn mark such that the leading-end position is not shifted, and changes the length of a portion on a nearer side (a side close to vehicle 300) than the leading-end position in graphic 51. Consequently, for example, as illustrated in part (b) of FIG. 7, the position indicated by graphic 51 that is the right-turn mark is maintained at the correct position as seen from the driver. The graphic deformation technique is applied to not only the case where the graphic is the right-turn mark but also various graphics indicating a predetermined position.

Display controller 140 can also perform the following processing. That is, with lengthening distance between vehicle 300 and spot T indicated by the road information, display controller 140 increases the length (the length in the Y-axis direction in the specific example 1) in the traveling direction of vehicle 300 in graphic 51. In the exemplary embodiment, the length of graphic 51 is increased such that the position indicated by graphic 51 is not changed. This display control allows the driver to clearly visually recognize graphic 51 when the disposition position of graphic 51 is relatively far, and the size on the display of graphic 51 is suppressed to satisfactorily secure the forward visual recognition when the disposition position of graphic 51 is relatively near.

For example, when graphic 51 that is the right-turn mark and a graphic indicating a character string "right turn" are disposed side by side, display controller 140 may perform the length update processing on the two graphics.

Specific Example 2

Figure 8:
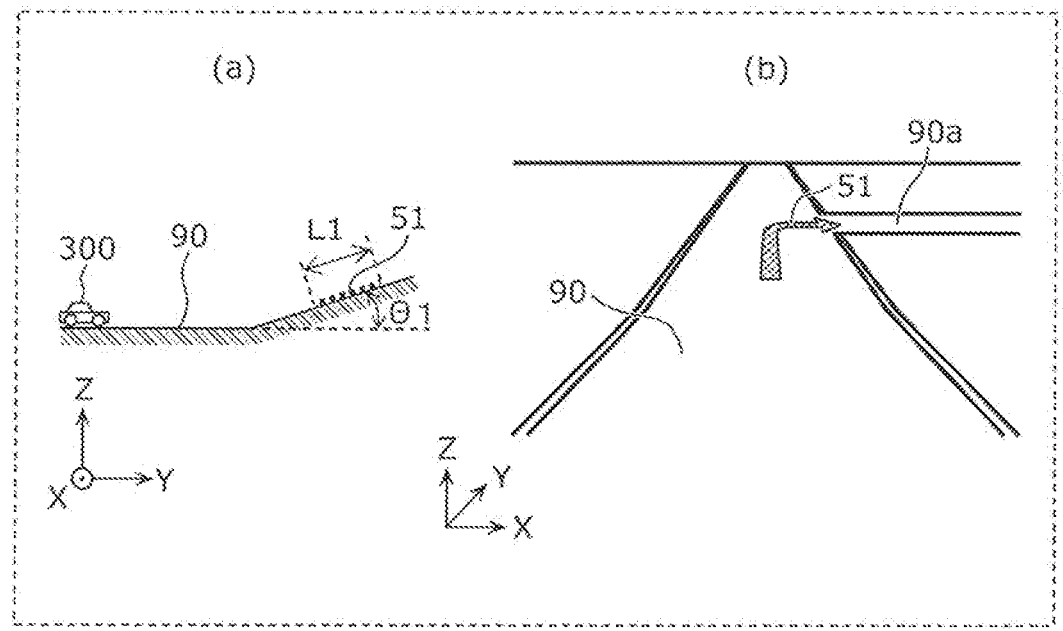
FIG. 8 is a schematic diagram illustrating a display content as a comparative example corresponding to a specific example 2.
Figure 9:
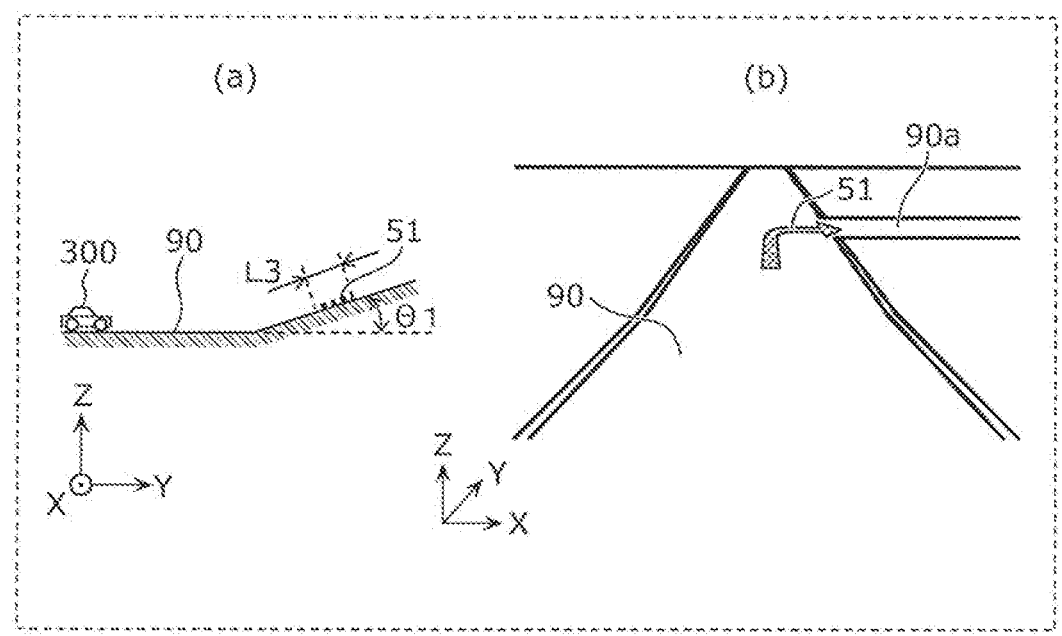
FIG. 9 is a first schematic diagram illustrating the specific example 2 of the display content by the display device.
Figure 10:
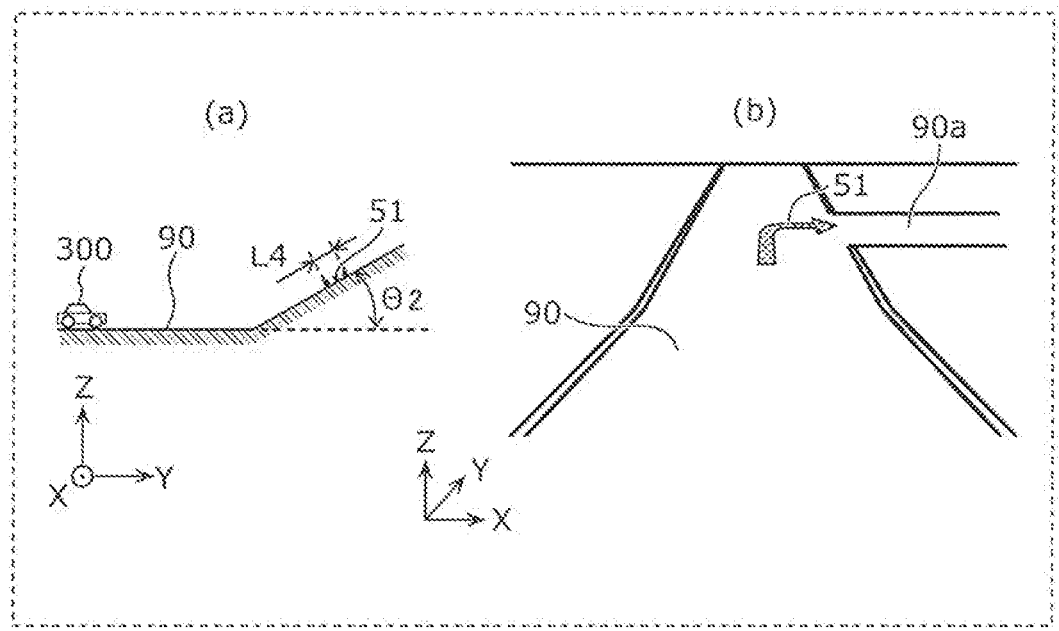
FIG. 10 is a second schematic diagram illustrating the specific example 2 of the display content by the display device.

FIG. 8 is a schematic diagram illustrating a display content as a comparative example corresponding to a specific example 2. FIG. 9 is a first schematic diagram illustrating the specific example 2 of the display content by display device 100. FIG. 10 is a second schematic diagram illustrating the specific example 2 of the display content by display device 100. In part (a) of FIG. 8, an existence range of the graphic is expressed by a bold dotted line in order to indicate the disposition position of the graphic virtually disposed on the road surface. This is also applied to other side views (in the exemplary embodiment, the view viewed from the X-axis direction) such as part (a) of FIG. 9 and part (a) of FIG. 10.

The display content in the case where vehicle 300 goes straight on road 90, turns right in a middle of the upslope, and enters road 90a will be described in the specific example 2. That is, in the specific example 2, a relative gradient angle that is an angle formed between a road surface in the disposition position of graphic 51 and the traveling direction is greater than zero when upward (for example, upward in FIG. 1) in vehicle 300 is set to positive.

In the specific example 2, graphic 51 indicating the right-turn mark is virtually disposed in the middle of the upslope existing in the traveling direction. That is, display controller 140 displays the virtual image illustrating graphic 51 disposed at the predetermined position in the middle of the upslope as seen from vehicle 300 (more particularly, the driver of vehicle 300) on windshield 201.

At this point, it is assumed that the length of graphic 51 indicating the right-turn mark is set to L1 similarly to the case (see the specific example 1) where graphic 51 is disposed in a posture parallel to the traveling direction. In this case, a disposition surface of graphic 51 is inclined onto the near side as illustrated in part (a) of FIG. 8 as seen from vehicle 300, whereby the size on the display of graphic 51 becomes relatively large as illustrated in part (b) of FIG. 8. As a result, for example, when a certain object (such as a person, an animal, and an obstacle on the road) exists in front of vehicle 300, the object is hardly visually recognized due to graphic 51. That is, the problem of the degradation of the forward visual recognition is generated.

In display device 100 of the exemplary embodiment, the length of graphic 51 is updated to L3 (L3<L1) when the relative gradient angle of the road surface at the disposition position of graphic 51 is greater than zero as illustrated in part (a) of FIG. 9. In the specific example 2, the length of graphic 51 is updated to L3 such that the position indicated by graphic 51 is not changed. Specifically, road information acquisition unit 110 acquires the road information indicating the relative gradient angle that is the angle formed between the traveling direction and the road surface at the disposition position of graphic 51. For example, road information acquisition unit 110 can calculate the relative gradient angle using at least one of the captured image data of camera 21 and the map data including the current position, the map data being received from navigation device 20. With increasing relative gradient angle indicated by the road information when upward of vehicle 300 is set to positive, display controller 140 decreases the length in an extending direction of the road at the disposition position of graphic 51. For example, display controller 140 sets the length of graphic 51 to L1 when the relative gradient angle is zero (that is, when graphic 51 is disposed in parallel to the traveling direction), and display controller 140 updates the length of graphic 51 to L3 (L3<L1) when the relative gradient angle is θ1 (θ1>0).

Consequently, as illustrated in part (b) of FIG. 9, the size on the display of graphic 51 is relatively reduced, and resultantly the visual recognition of the object is secured when some sort of object exists in front of vehicle 300. That is, the problem of the degradation of the forward visual recognition is hardly generated.

As illustrated in part (a) of FIG. 10, when the relative gradient angle is θ2 (θ2>θ1), display controller 140 updates the length of graphic 51 to L4 (L4<L3). Consequently, for example, even if graphic 51 is disposed in the middle of the relatively steep upslope, as illustrated in part (b) of FIG. 10, the size on the display of graphic 51 is maintained to the same extent as the case where the relative gradient angle is θ1 (see part (b) of FIG. 9).

The "relative gradient angle" is calculated based on the traveling direction (that is, a slope of the road surface when vehicle 300 is traveling) of vehicle 300. For this reason, for example, when vehicle 300 travels on the downslope and graphic 51 is virtually disposed in the middle of the forward horizontal road, the relative gradient angle used to update the length of graphic 51 is "positive" when upward of vehicle 300 is set to positive. This applies to other specific examples.

Specific Example 3

Figure 11:
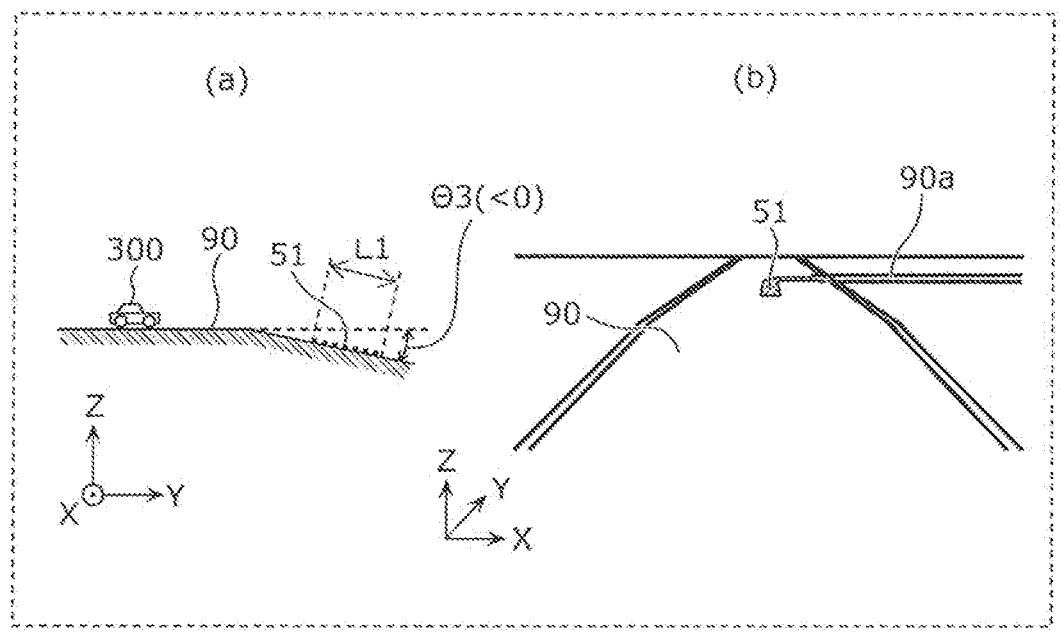
FIG. 11 is a schematic diagram illustrating a display content as a comparative example corresponding to a specific example 3.
Figure 12:
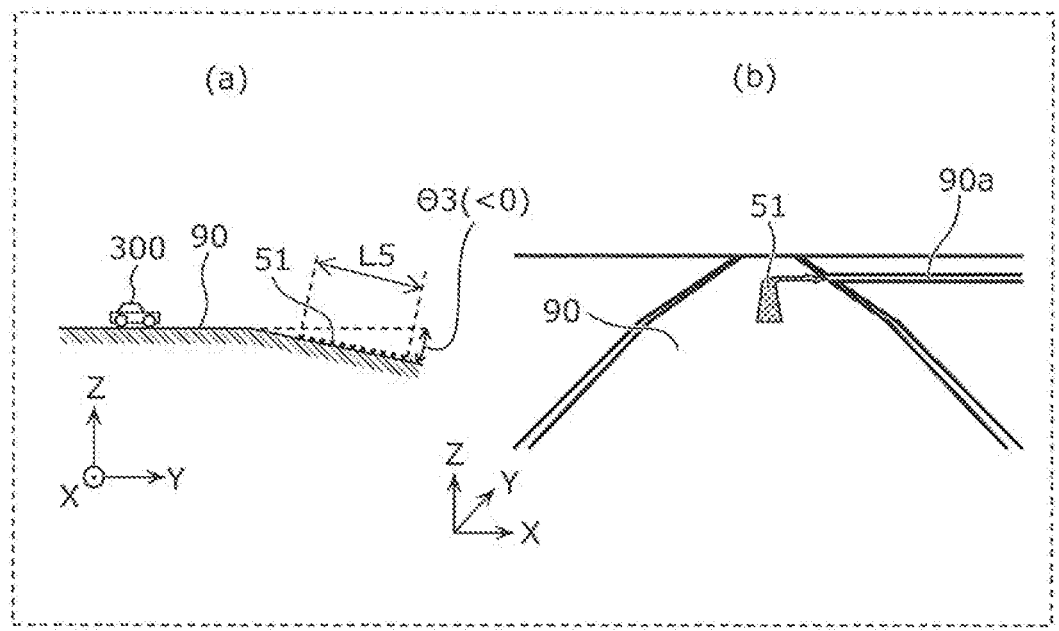
FIG. 12 is a schematic diagram illustrating the specific example 3 of the display content by the display device.

FIG. 11 is a schematic diagram illustrating a display content as a comparative example corresponding to a specific example 3. FIG. 12 is a schematic diagram illustrating the specific example 3 of the display content by display device 100.

The display content in the case where vehicle 300 goes straight on road 90, turns right in the middle of the downslope, and enters road 90a will be described in the specific example 3. That is, in the specific example 3, the relative gradient angle is less than zero when upward of vehicle 300 is set to positive.

In the specific example 3, graphic 51 indicating the right-turn mark is virtually disposed in the middle of the downslope existing in the traveling direction. That is, display controller 140 displays the virtual image illustrating graphic 51 disposed at the predetermined position in the middle of the downslope as seen from vehicle 300 (more particularly, the driver of vehicle 300) on windshield 201.

At this point, it is assumed that the length of graphic 51 indicating the right-turn mark is set to L1 similarly to the case (see the specific example 1) where graphic 51 is disposed in a posture parallel to the traveling direction. In this case, the disposition surface of graphic 51 is inclined onto the far side as illustrated in part (a) of FIG. 11 as seen from vehicle 300, whereby the size on the display of graphic 51 becomes small as illustrated in part (b) of FIG. 11. As a result, for example, the driver hardly visually recognizes graphic 51.

In display device 100 of the exemplary embodiment, the length of graphic 51 is updated to L5 (L5>L1) when relative gradient angle θ3 of the road surface at the disposition position of graphic 51 is less than zero as illustrated in part (a) of FIG. 12. In the specific example 3, the length of graphic 51 is updated to L5 such that the position indicated by graphic 51 is not changed. Specifically, road information acquisition unit 110 acquires the road information indicating the relative gradient angle with respect to the disposition position of graphic 51. With decreasing relative gradient angle indicated by the road information when upward of vehicle 300 is set to positive, display controller 140 increases the length in an extending direction of the road at the disposition position of graphic 51. For example, display controller 140 sets the length of graphic 51 to L1 when the relative gradient angle is zero (that is, when graphic 51 is disposed in parallel to the traveling direction), and display controller 140 updates the length of graphic 51 to L5 (L5>L1) when the relative gradient angle is θ3 (θ3<0).

Consequently, as illustrated in part (b) of FIG. 12, the size on the display of graphic 51 is enlarged to an extent to which the driver can clearly visually recognize the size on the display of graphic 51, and resultantly the route can adequately be guided for the driver.

When the relative gradient angle is less than θ3, display controller 140 updates the length of graphic 51 to a value greater than L5. Consequently, for example, even if graphic 51 is disposed in the middle of the relatively steep downslope, the size on the display of graphic 51 is maintained at the same extent as the case where the relative gradient angle is θ3.

As described above, the "relative gradient angle" is calculated based on the traveling direction (that is, the slope of the road surface when vehicle 300 is traveling) of vehicle 300. For this reason, for example, when vehicle 300 travels on the upslope and graphic 51 is virtually disposed in the middle of the forward horizontal road, the relative gradient angle used to update the length of graphic 51 is "negative" when upward of vehicle 300 is set to positive. This applies to other specific examples.

Specific Example 4

Figure 13:
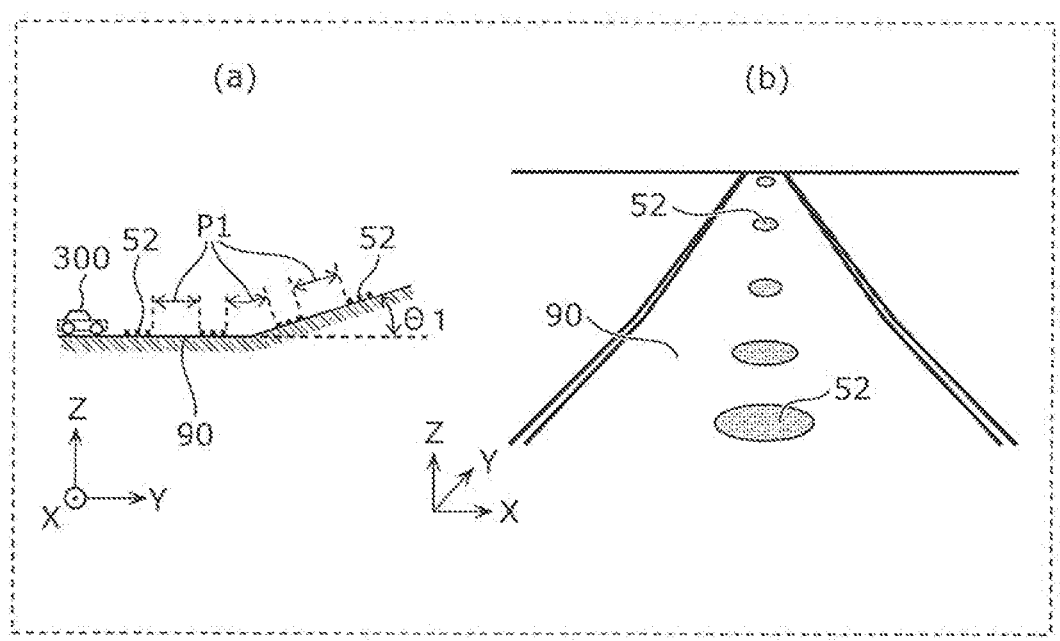
FIG. 13 is a schematic diagram illustrating a display context as a comparative example corresponding to a specific example 4.
Figure 14:
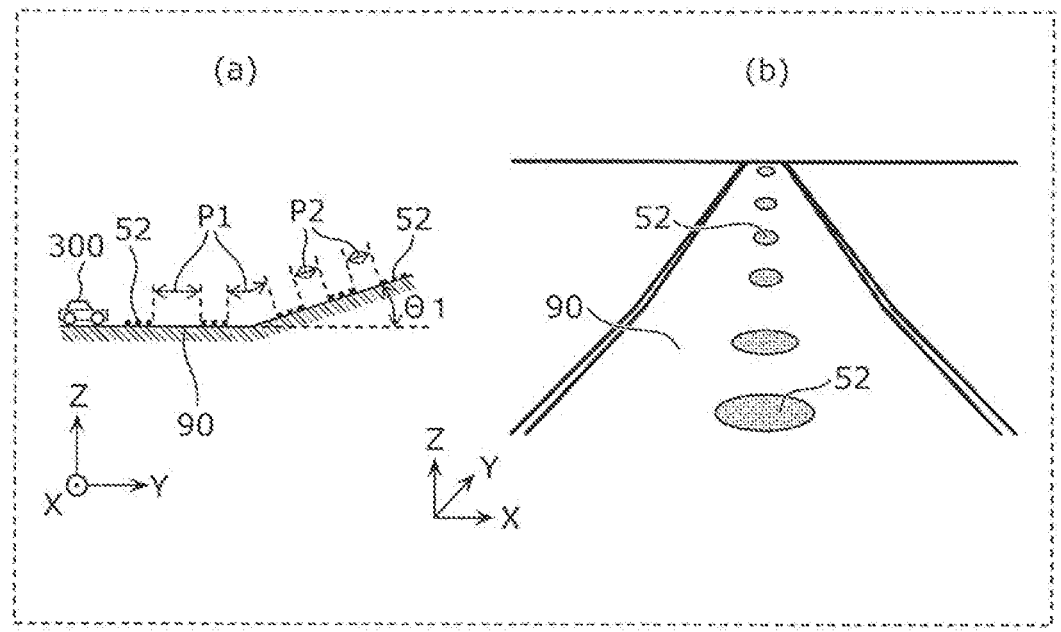
FIG. 14 is a schematic diagram illustrating the specific example 4 of the display content by the display device.

FIG. 13 is a schematic diagram illustrating a display content as a comparative example corresponding to a specific example 4. FIG. 14 is a schematic diagram illustrating the specific example 4 of the display content by display device 100.

The display content in the case where vehicle 300 goes straight on the upslope after going straight on horizontal road 90 will be described in the specific example 4. That is, in the specific example 4, the relative gradient angle is greater than zero when upward of vehicle 300 is set to positive.

In the specific example 4, it is assumed that a plurality of graphics 52 are continuously disposed along the route of vehicle 300. That is, in the specific example 4, the plurality of graphics 52 are continuously and virtually disposed from the horizontal portion of road 90 to the visually recognizable range of the upslope of road 90 in the traveling direction of vehicle 300.

Thus, display controller 140 displays the virtual image illustrating the plurality of graphics 52 arranged on road 90 including the upslope as seen from vehicle 300 (more particularly, the driver of vehicle 300) on windshield 201.

Desirably a spacing between two graphics 52 adjacent to each other in the plurality of graphic 52 is long to an extent to which the driver easily recognizes the arrangement of the plurality of graphics 52 when the plurality of graphics 52 are arranged on the road surface parallel to the traveling direction or to an extent to which the forward visual recognition is not lowered. Spacing P1 between two graphics 52 adjacent to each other is decided from this viewpoint.

When decided spacing P1 is applied all graphics 52 included in the virtual image as illustrated in part (a) of FIG. 13, the plurality of graphics 52 located on the road surface parallel to the traveling direction and on the near side as seen from vehicle 300 is visually recognized with an adequate distance as illustrated in part (b) of FIG. 13. However, in the plurality of graphics 52 that are located on the depth side as seen from vehicle 300 and disposed on the upslope, because the distance between two graphics 52 adjacent to each other is lengthened, there is a risk of losing continuity of the plurality of graphics 52 for the route guidance.

In display device 100 of the exemplary embodiment, the spacing of two graphics 52 is updated to P2 (P2<P1) when the relative gradient angles of the road surfaces at the disposition positions of two graphics 52 are greater than zero as illustrated in part (a) of FIG. 14. Specifically, road information acquisition unit 110 acquires the road information indicating the relative gradient angle with respect to the disposition positions of two graphics 52. With increasing relative gradient angle indicated by the road information when upward of vehicle 300 is set to positive, display controller 140 decreases the spacing between two graphics 52 in the extending direction (that is, a direction in which two graphics 52 are arranged) of the road at the disposition position. For example, display controller 140 sets the spacing between two graphics 52 to P1 when the relative gradient angle is zero (that is, when two graphics 52 are arranged in parallel to the traveling direction), and display controller 140 updates the spacing between two graphics 52 to P2 (P2<P1) when the relative gradient angle is θ1 (θ1>0).

Consequently, as illustrated in part (b) of FIG. 14, the spacing on the display between two graphics 52 virtually disposed on the upslope becomes relatively small, and resultantly the continuity of the plurality of graphics 52 virtually disposed along the route including the upslope is maintained. That is, the route can adequately be guided for the driver.

Specific Example 5

Figure 15:
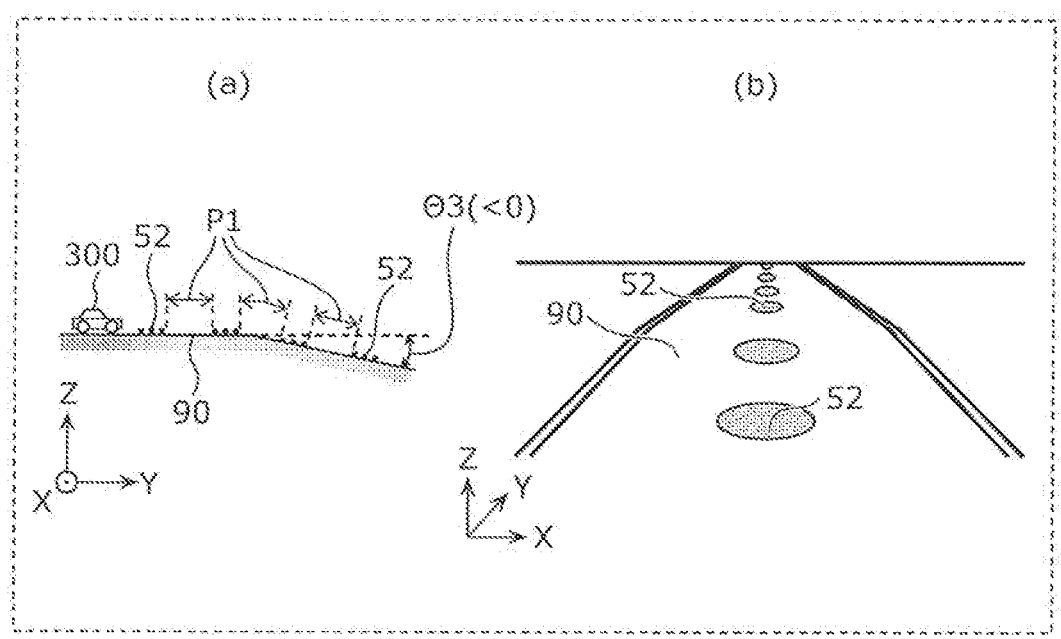
FIG. 15 is a schematic diagram illustrating a display content as a comparative example corresponding to a specific example 5.
Figure 16:
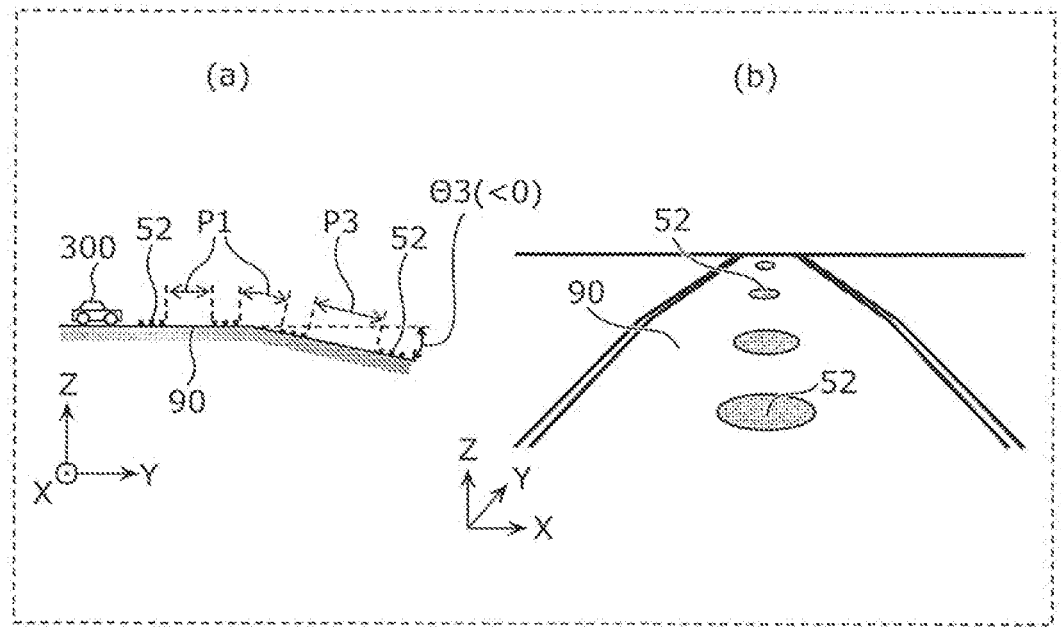
FIG. 16 is a schematic diagram illustrating a specific example 5 of the display content by the display device.

FIG. 15 is a schematic diagram illustrating a display content as a comparative example corresponding to a specific example 5. FIG. 16 is a schematic diagram illustrating the specific example 5 of the display content by display device 100.

The display content in the case where vehicle 300 goes straight on a downslope after going straight on horizontal road 90 will be described in the specific example 5. That is, in the specific example 5, the relative gradient angle is less than zero when upward of vehicle 300 is set to positive.

In the specific example 5, it is assumed that the plurality of graphics 52 are continuously disposed along the route of vehicle 300. That is, in the specific example 5, the plurality of graphics 52 are continuously and virtually disposed from the horizontal portion of road 90 to the visually recognizable range of the downslope of road 90 in the traveling direction of vehicle 300.

Thus, display controller 140 displays the virtual image illustrating the plurality of graphics 52 arranged on road 90 including the downslope as seen from vehicle 300 (more particularly, the driver of vehicle 300) on windshield 201.

At this point, as described above in the specific example 4, the spacing between two graphics 52 adjacent to each other in the plurality of graphics 52 is decided as P1 based on the road surface parallel to the traveling direction.

When decided spacing P1 is applied to all graphics 52 included in the virtual image as illustrated in part (a) of FIG. 15, the plurality of graphics 52 located on the road surface parallel to the traveling direction and on the near side as seen from vehicle 300 is visually recognized with an adequate distance as illustrated in part (b) of FIG. 15. However, in the plurality of graphics 52 that are located on the depth side as seen from vehicle 300 and disposed on the downslope, the distance between two graphics 52 adjacent to each other is shortened. As a result, for example, when a certain object exists in front of vehicle 300, the object is hardly visually recognized due to the plurality of graphics 52 that are arranged while the distance is decreased. That is, the problem of the degradation of the forward visual recognition is generated.

In display device 100 of the exemplary embodiment, the spacing of two graphics 52 is updated to P3 (P3>P1) when the relative gradient angles of the road surfaces at the disposition positions of two graphics 52 are less than zero as illustrated in part (a) of FIG. 16. Specifically, road information acquisition unit 110 acquires the road information indicating the relative gradient angle with respect to the disposition positions of two graphics 52. With decreasing relative gradient angle indicated by the road information when upward of vehicle 300 is set to positive, display controller 140 increases the spacing between two graphics 52 in the extending direction (that is, a direction in which two graphics 52 are arranged) of the road at the disposition position. For example, display controller 140 sets the spacing between two graphics 52 to P1 when the relative gradient angle is zero (that is, when two graphics 52 are arranged in parallel to the traveling direction), and display controller 140 updates the spacing between two graphics 52 to P3 (P3>P1) when the relative gradient angle is θ3 (θ3<0).

Consequently, as illustrated in part (b) of FIG. 16, the spacing on the display between two graphics 52 virtually disposed on the downslope is widened to an extent to which the continuity is not lost. As a result, for example, when a certain object exists in front of vehicle 300, the visual recognition of the object is secured. That is, the problem of the degradation of the forward visual recognition is hardly generated.

Specific Example 6

Figure 17:
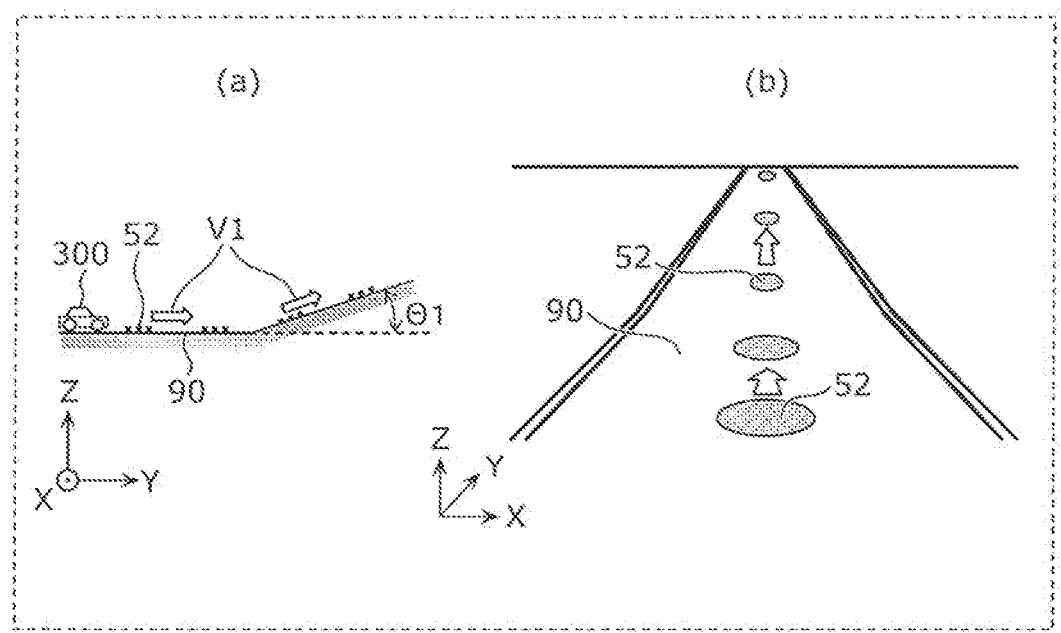
FIG. 17 is a schematic diagram illustrating a display content as a comparative example corresponding to a specific example 6.
Figure 18:
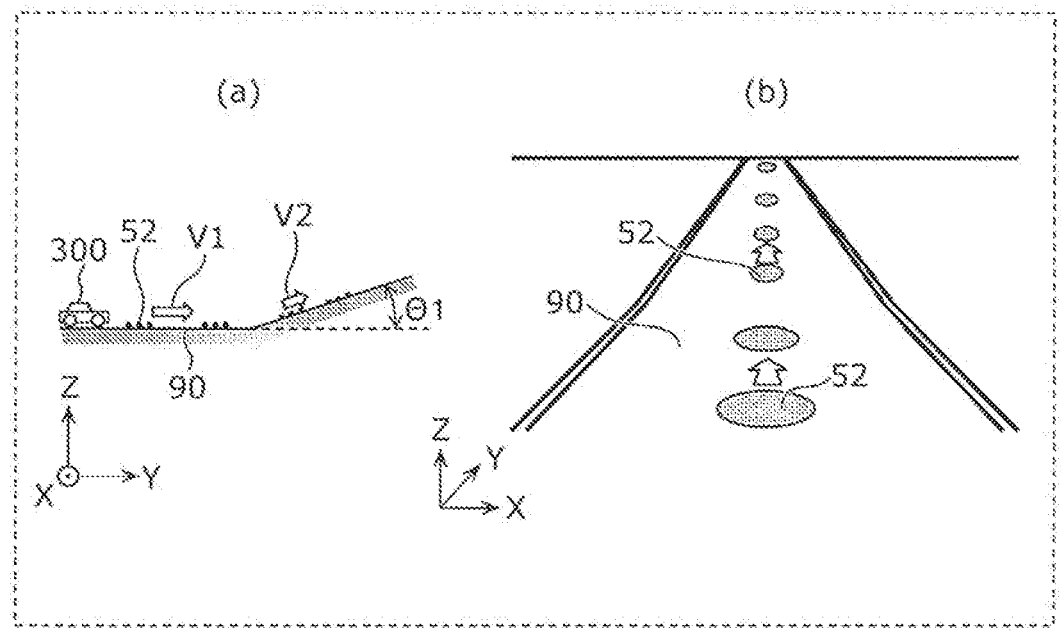
FIG. 18 is a schematic diagram illustrating the specific example 6 of the display content by the display device.

FIG. 17 is a schematic diagram illustrating a display content as a comparative example corresponding to a specific example 6. FIG. 18 is a schematic diagram illustrating the specific example 6 of the display content by display device 100.

The display content in the case where vehicle 300 goes straight on the upslope after going straight on horizontal road 90 will be described in the specific example 4. That is, in the specific example 6, the relative gradient angle is greater than zero when upward of vehicle 300 is set to positive.

In the specific example 6, it is assumed that the plurality of graphics 52 are continuously and virtually disposed along the route of vehicle 300, and that the plurality of graphics 52 move. That is, animation display in which the plurality of graphics 52 move along the route from the horizontal portion of road 90 to the visually recognizable range of the upslope of road 90 in the traveling direction of vehicle 300 is performed in the specific example 6.

Thus, display controller 140 displays the virtual image illustrating the plurality of graphics 52 that are arranged on road 90 including the upslope and moves forward as seen from vehicle 300 (more particularly, the driver of vehicle 300) on windshield 201.

Desirably the moving speed in the case where graphic 52 moves along the route is a speed of an extent to which the driver easily recognizes the movement and the moving direction of graphic 52 when graphic 52 is moved on the road surface parallel to the traveling direction. Moving speed V1 of graphic 52 is decided from this viewpoint.

When decided moving speed V1 is applied all graphics 52 included in the virtual image as illustrated in part (a) of FIG. 17, the plurality of graphics 52 located on the road surface parallel to the traveling direction and on the near side as seen from vehicle 300 moves apparently with an easily recognizable speed by the driver as illustrated in part (b) of FIG. 17. However, because the plurality of graphics 52 that are located on the depth side as seen from vehicle 300 and disposed on the upslope moves with a relatively fast speed, the driver hardly visually recognizes the movement and the moving direction of graphic 52.

In display device 100 of the exemplary embodiment, the moving speed of graphic 52 is updated to V2 (V2<V1) when the relative gradient angle of the road surface at the disposition position of moving graphic 52 is greater than zero as illustrated in part (a) of FIG. 18. Specifically, road information acquisition unit 110 acquires the road information indicating the relative gradient angle with respect to the disposition position of at least one graphic 52. Display controller 140 superimposes the virtual image on the real space to display the virtual image on windshield 201 while moving at least one graphic the extending direction of the road at the disposition position, and decreases the moving speed of at least one graphic 52 with increasing relative gradient angle when upward of vehicle 300 is set to positive, the relative gradient angle being indicated by the road information. For example, display controller 140 sets the moving speed of at least one graphic 52 to V1 when the relative gradient angle is zero (that is, when at least one graphic 52 is disposed in parallel to the traveling direction), and display controller 140 updates the moving speed of at least one graphic 52 to V2 (V2<V1) when the relative gradient angle is θ1 (θ1>0).

Consequently, as illustrated in part (b) of FIG. 18, the moving speed on the display of at least one graphic 52 virtually disposed on the upslope becomes relatively small, and resultantly the easiness of the recognition of the movement and the moving direction of at least one graphic 52 virtually disposed on the upslope is secured. That is, the route can adequately be guided for the driver.

Display controller 140 can also perform the following processing. That is, display controller 140 superimposes the virtual image on the real space to display the virtual image to the display medium while moving at least one graphic 52 in the extending direction of the road at the disposition position, and increases the moving speed of at least one graphic 52 with decreasing relative gradient angle when upward of vehicle 300 is set to positive, the relative gradient angle being indicated by the road information.

For example, display controller 140 increases the moving speed of at least one graphic 52 such that the moving speed is greater than V1 when at least one graphic 52 is virtually disposed on the downslope (when the relative gradient angle is negative). Consequently, the driver easily recognizes the movement and the moving direction of at least one graphic 52 that is visually recognized so as to move along the downslope.

Specific Example 7

Figure 19:
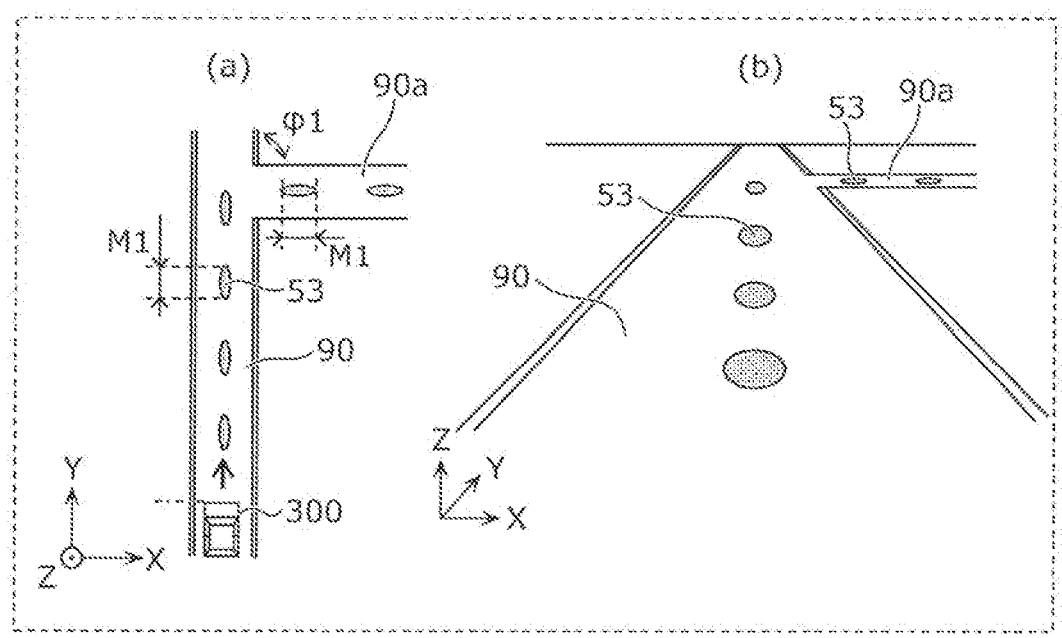
FIG. 19 is a schematic diagram illustrating a display content as a comparative example corresponding to a specific example 7.
Figure 20:
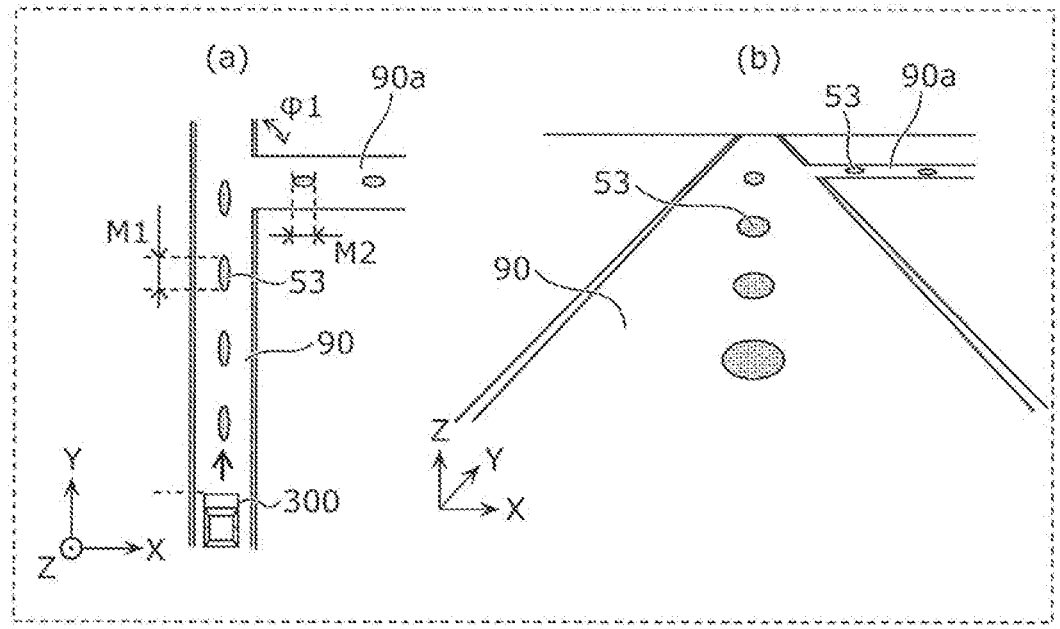
FIG. 20 is a schematic diagram illustrating the specific example 7 of the display content by the display device.

FIG. 19 is a schematic diagram illustrating a display content as a comparative example corresponding to a specific example 7. FIG. 20 is a schematic diagram illustrating the specific example 7 of the display content by display device 100.

The display content in the case where vehicle 300 goes straight on road 90, turns right at a predetermined position on road 90, and enters road 90a will be described in the specific example 7.

In the specific example 7, it is assumed that a plurality of graphics 53 are continuously disposed along the route of vehicle 300. That is, in the specific example 7, the plurality of graphics 53 are continuously and virtually disposed along the route turning in the middle.

Thus, display controller 140 displays the virtual image illustrating the plurality of graphics 53 arranged on roads 90 and 90a as seen from vehicle 300 (more particularly, the driver of vehicle 300) on windshield 201.

At this point, preferably the length in the traveling direction of graphic 53 virtually disposed on the road surface is relatively long as illustrated in part (a) of FIG. 19 such that graphic 53 observed from obliquely above is adequately recognized. Length M1 of graphic 53 is decided from this viewpoint.

When decided length M1 is applied all graphics 53 included in the virtual image, the plurality of graphics 53 disposed along the current traveling direction and on the near side as seen from vehicle 300 is visually recognized with the adequate shape and size as illustrated in part (b) of FIG. 19. However because longitudinal directions of the plurality of graphics 53 that are located on the depth side as seen from vehicle 300 and disposed in a direction intersecting with the current traveling direction are disposed in a direction intersecting with a visual line of the driver, the graphics 53 are displayed while compressed in the longitudinal direction. As a result, identity of at least one graphic 53 on road 90 and at least one graphic 53 on road 90a is lost, and there is a risk of losing the route guiding function by the plurality of graphics 53 continuously disposed.

For this reason, in display device 100 of the exemplary embodiment, road information acquisition unit 110 acquires the road information indicating a turning angle that is an angle formed between the traveling direction and the extending direction (in the specific example 7, the extending direction of road 90a) of road at the disposition position that is the virtual position where graphic 53 is to be disposed. Display controller 140 decreases the length in the extending direction of graphic 53 with increasing turning angle indicated by the road information.

For example, as illustrated in part (a) of FIG. 20, display controller 140 sets the length of at least one graphic 53 (that is, at least one graphic 53 disposed on road 90) having no turning angle to M1, and updates the length of at least one graphic 53 (that is, at least one graphic 53 disposed on road 90a) in which the turning angle is φ1 (0°<φ1≤90°) to M2 (M2<M1).

Consequently, as illustrated in part (b) of FIG. 20, the shape on the display of at least one graphic 53 virtually disposed ahead of the position (direction change position) at which the route turns laterally comes close to the shape on the display of at least one graphic 53 virtually disposed in front of the direction change position. As a result, for example, the identity of the plurality of graphics 53 continuously disposed along the route is maintained, and the route guidance is adequately performed for the driver.

Display controller 140 can also perform the following processing. That is, display controller 140 increases the length in the extending direction of graphic 53 with decreasing turning angle indicated by the road information.

For example, when a reference of the length of graphic 53 along the route is set to M2, display controller 140 brings the length of graphic 53 close to M1 from M2 as turning angle φ1 in part (a) of FIG. 20 comes close to 0°. That is, the length of graphic 53 is increased. Even in this display control, the shape on the display of at least one graphic 53 virtually disposed ahead of the position at which the route turns comes close to the shape on the display of at least one graphic 53 virtually disposed in front of the point at which the route turns. As a result, for example, the identity of the plurality of graphics 53 continuously disposed along the route is maintained, and the route guidance is adequately performed for the driver.

Specific Example 8

Figure 21:
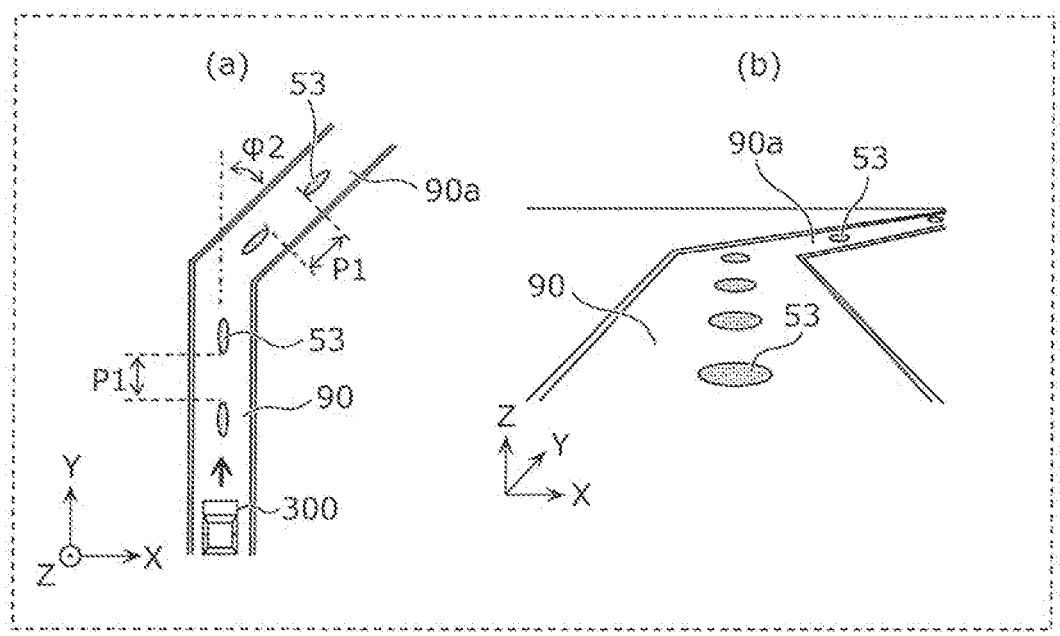
FIG. 21 is a schematic diagram illustrating a display content as a comparative example corresponding to a specific example 8.
Figure 22:
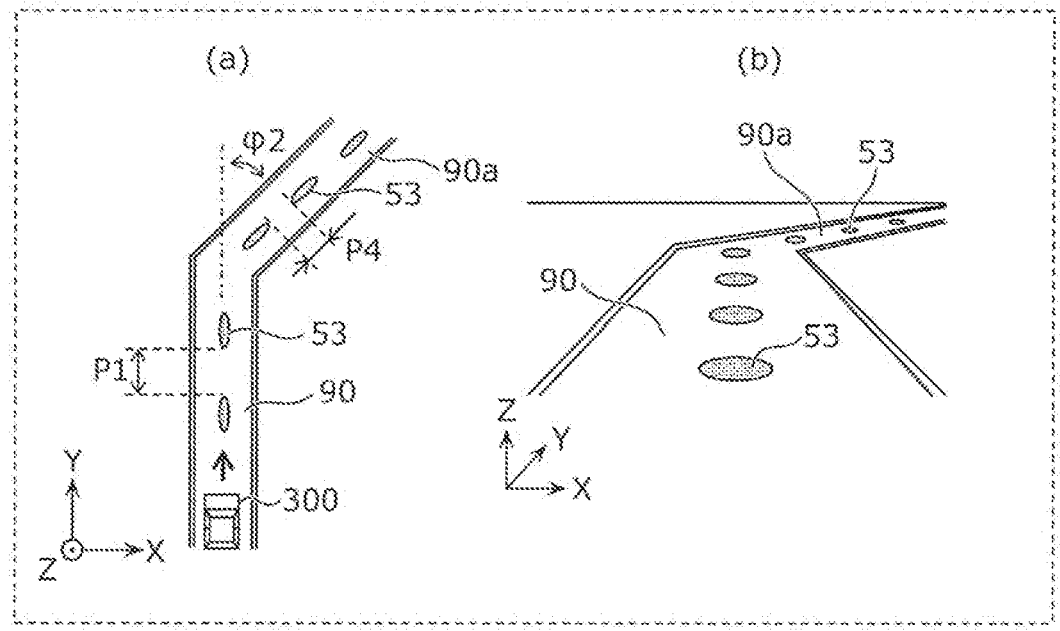
FIG. 22 is a first schematic diagram illustrating the specific example 8 of the display content by the display device.
Figure 23:
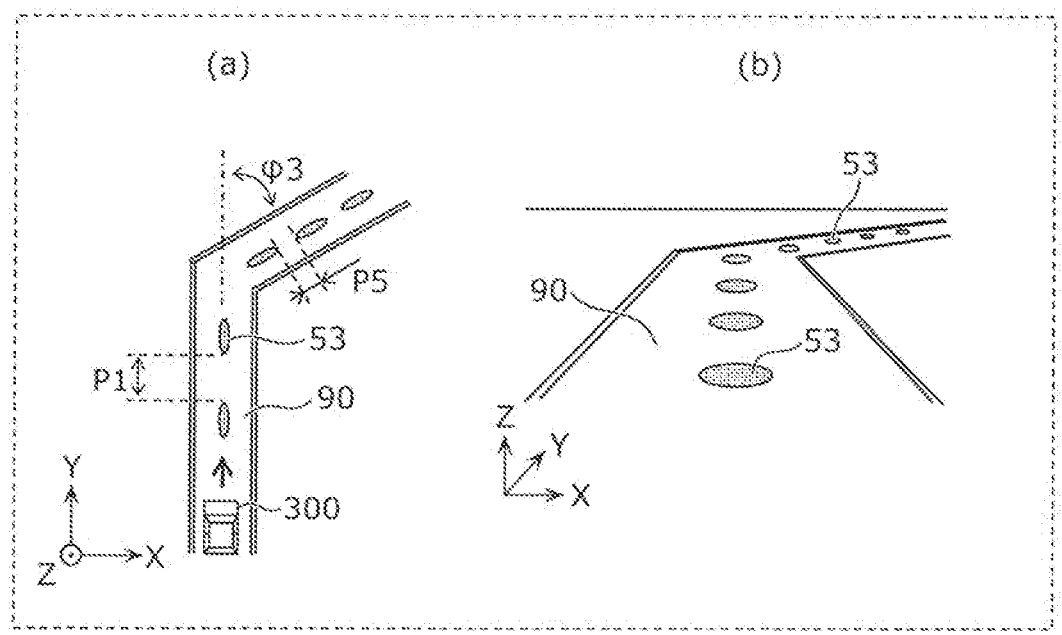
FIG. 23 is a second schematic diagram illustrating the specific example 8 of the display content by the display device.

FIG. 21 is a schematic diagram illustrating a display content as a comparative example corresponding to a specific example 8. FIG. 22 is a first schematic diagram illustrating the specific example 8 of the display content by display device 100. FIG. 23 is a second schematic diagram illustrating the specific example 8 of the display content by display device 100.

The display content in the case where vehicle 300 travels on road 90 curved in the middle will be described in the specific example 8.

In the specific example 8, it is assumed that the plurality of graphics 53 are continuously disposed along the route of vehicle 300. That is, in the specific example 8, the plurality of graphics 53 are continuously and virtually disposed along road 90 curved in the middle.

Thus, display controller 140 displays the virtual image illustrating the plurality of graphics 53 arranged on road 90 as seen from vehicle 300 (more particularly, the driver of vehicle 300) on windshield 201, the arrangement direction of the plurality of graphics 53 turning in the middle.

At this point, as described above in the specific example 4, the spacing between two graphics 53 adjacent to each other in the plurality of graphics 53 is decided as P1 based on the road surface parallel to the traveling direction.

When decided spacing P1 is applied to all graphics 53 included in the virtual image as illustrated in part (a) of FIG. 21, the plurality of graphics 53 located on the road surface parallel to the traveling direction and on the near side as seen from vehicle 300 is visually recognized with an adequate distance as illustrated in part (b) of FIG. 21. However, in the plurality of graphics 53 that are located on the depth side as seen from vehicle 300 and virtually disposed ahead of the direction change position, because the distance between two graphics 53 adjacent to each other is lengthened, there is a risk of losing continuity of the plurality of graphics 53 for the route guidance.

For this reason, in display device 100 of the exemplary embodiment, road information acquisition unit 110 acquires the road information indicating the turning angle with respect to two graphic 53. Display controller 140 decreases the spacing between two graphics 53 with increasing turning angle indicated by the road information. For example, as illustrated in part (a) of FIG. 22, display controller 140 sets the spacing for at least one graphic 53 (that is, two graphics 53 disposed in front of the direction change position) having no turning angle to P1, and updates the spacing between two graphics 53 (that is, two graphics 53 disposed ahead of the direction change position) in which the turning angle is φ2 (0°<φ2≤90°) to P4 (P4<P1).

Consequently, as illustrated in part (b) of FIG. 22, the spacing on the display between two graphics 53 virtually disposed ahead of the direction change position becomes relatively small, and resultantly the continuity of the plurality of graphics 53 virtually disposed along the route including the curve is maintained. That is, the route can adequately be guided for the driver.

As illustrated in part (a) of FIG. 23, when the turning angle is φ3 (φ2<φ3≤90°), display controller 140 updates the length of the spacing between two graphics 53 virtually disposed ahead of the direction change position to P5 (P5<P4). Consequently, for example, even if a sharp curve is included in the route of vehicle 300, as illustrated in part (b) of FIG. 23, the spacing on the display of two graphics 53 located ahead of the sharp curve is maintained to the same extent as the case where the turning angle is φ2 (see part (b) of FIG. 22).

Display controller 140 can also perform the following processing. That is, display controller 140 increases the spacing between two graphics 53 with decreasing turning angle indicated by the road information.

For example, when a reference of the spacing between two graphics 53 is set to P4, display controller 140 brings the spacing between two graphics 53 close to P1 from P4 as turning angle φ2 in part (a) of FIG. 20 comes close to 0°. That is, the spacing between two graphics 53 is increased. Even in this display control, the spacing between two graphics 53 virtually disposed ahead of the direction change position is maintained at the adequate length, and resultantly the route can adequately be guided for the driver.

Other Exemplary Embodiments

As described above, the exemplary embodiment is used as an example of the technique of the present invention. However, the exemplary embodiment is only an example, and various modifications, additions, omissions, and the like can be made.

For example, the display contents indicated by at least two specific examples included in the specific examples 1 to 8 may be combined. For example, the processing of updating the length of graphic 51, which is described in the specific example 2 or 3, may be applied to each of the plurality of graphics 52 arranged on the upslope or the downslope, which is described in the specific examples 4 to 6.

The graphic virtually disposed on the road by display device 100 is not limited to the right-turn mark or continuous ellipses. Display device 100 may display the virtual image illustrating graphics indicating a character, a symbol, a numeral, and the like to the display medium.

For example, display device 100 may display the graphic indicating the forward vehicle of a tracking target, the graphic being used in adaptive cruise control (ACC). Specifically, for example, when a distance to vehicle 300 is shortened due to deceleration of the forward vehicle, display controller 140 may shorten the length in the traveling direction of vehicle 300 of the graphic virtually disposed behind the forward vehicle. Consequently, excessive enlargement of the graphic in the virtual image due to the short distance between vehicle 300 and the forward vehicle is prevented. As a result, the degradation of the forward visual recognition due to the graphic is prevented.

Display device 100 does not include HUD unit 190, but may include a display panel (such as a liquid crystal panel and an organic EL (Electro Luminescence) panel) that is the display medium. In this case, for example, display controller 140 of display device 100 can cause the display panel to display the virtual image while superimposing the virtual image on the real space that displays the real space captured by camera 21 or the like.

For example, display device 100 may have the function as the navigation device. In other words, display device 100 may be includes in the moving body such as the vehicle as a part of the navigation device.

Display device 100 may generate the virtual image while adding information from various sensors (such as a speed sensor and a rotation speed sensor) that detect a state of vehicle 300. For example, display controller 140 may acquire a detection result of a posture change of vehicle 300 due to irregularities of the road surface on which vehicle 300 is traveling through a CAN (Controller Area Network), and generate the virtual image using the acquired detection result. In this case, the acquired detection result may be dealt with as a part of the road information acquired by road information acquisition unit 110.

In the exemplary embodiment, although HUD unit 190 projects the image on windshield 201. Alternatively, the image may be projected on a combiner that is a half mirror provided separately from windshield 201. HUD unit 190 may display the image on a transmission type display provided inside or on the surface of windshield 201.

The configuration, the display method, and the like of HUD unit 190 illustrated in the exemplary embodiment are not limited to those illustrated in FIG. 3B, and any existing technique relating to the HUD may be applied for modification. For example, a laser projector, a liquid crystal on silicon (LCOS), or the like may be used instead of LCD 191, and a lens may be used instead of a mirror. The number of mirrors or the like may be any number. An angle of concave mirror 193 or the like can be adjusted by drive of a motor or the like according to a height of point of view E1 of the driver.

The whole or some of the procedure (see FIG. 4) of the display control processing in display device 100 may be provided by hardware or software. The processing by software is provided by a processor included in a computer or the like that execute a control program for display control processing stored in a memory. The control program may be distributed or circulated while recorded in a recording medium. For example, making a control program distributed be installed in a device having a processor to make the processor of the device execute the control program makes it possible to make the device execute all or some of display control processing.

Although a computer in the above-mentioned display device 100 is not necessarily indispensable, display device 100 may include an input device such as a touch pad, an output device such as a display or a speaker, a storage device such as a hard disc device or a solid state drive (SSD), a reading device that reads out information from a recording medium such as a digital versatile disc read only memory (DVD-ROM) or a universal serial bus (USB) memory, or a transmitter-receiver that performs communication through a network. For example, when the above-mentioned control program is recorded in a recording medium such as a USB memory, the reading device reads out the control program and makes the control program be stored in a memory or another storage device. The transmitter-receiver may perform communication with an external server device storing the control program via a network to make the control program be downloaded from the server device to store it in a memory or another recording device. The whole or some of portions except for HUD unit 190 of display device 100 may be formed as an integrated circuit.

The display device according to one or more aspects have been described above based on the exemplary embodiment. However, the present invention is not limited to this exemplary embodiment. Configurations in which various variations conceived by those skilled in the art are applied to the present exemplary embodiment, and aspects established by combining constituent elements in different exemplary embodiments may also fall within the present invention without departing from the gist of the present invention.

INDUSTRIAL APPLICABILITY

The present invention can be applied to a display device and the like that controls the display of information provided to the occupant of the moving body such as the vehicle.

REFERENCE MARKS IN THE DRAWINGS

10: display system
20: navigation device
21: camera
51, 52, 53: graphic
90, 90*a*: road
100: display device
110: road information acquisition unit
120: positional information acquisition unit
140: display controller
190: HUD unit
191: LCD
192: plane mirror
193: concave mirror
201: windshield
300: vehicle
301: dashboard
D1: predetermined region
E1: point of view
I1: HUD display plane

What is claimed is:

1. A display device included in a moving body, the display device comprising:
    a processor; and
    a memory including at least one set of instructions that, when executed by the processor, causes the processor to perform operations including:
    acquiring one or more road information items about a road in a foreground of the moving body;
    causing a head-up-display to display a virtual image illustrating a plurality of graphics as seen from the moving body on a display medium such that a driver of the moving body visually recognizes the virtual image superimposed on a real space in a traveling direction of the moving body when the plurality of graphics are disposed at a predetermined position in the traveling direction;
    updating a mode of the plurality of graphics using the one or more acquired road information items, and causing the head-up-display to display virtual image illustrating the plurality of graphics updated on the display medium; and
    acquiring a turning angle that is an angle formed between the traveling direction and an extending direction of a road at a disposition position that is a virtual position where the plurality of graphics are to be disposed as one of the one or more road information items, wherein
    the processor sets a length of at least one of the plurality of graphics when the turning angle is 0°, and decreases the length of the at least one of the plurality of graphics when the turning angle is greater than 0° and less than or equal to 90°.

2. The display device according to claim 1, wherein when the turning angle is less than or equal to 90°, the processor increases the spacing in the extending direction of the adjacent graphics in the plurality of graphics as the turning angle decreases.

3. The display device according to claim 1, wherein when the turning angle is less than or equal to 90°, the processor decreases a spacing in the extending direction of adjacent graphics in the plurality of graphics as the turning angle increases.

* * * * *